United States Patent
Harada et al.

(10) Patent No.: US 11,118,677 B2
(45) Date of Patent: Sep. 14, 2021

(54) TRANSMISSION CONTROL DEVICE OF AUTOMATIC TRANSMISSION DEVICE

(71) Applicant: AISIN SEIKI KABUSHIKI KAISHA, Kariya (JP)

(72) Inventors: Koji Harada, Kariya (JP); Futoshi Hattori, Kariya (JP); Koichi Saito, Kariya (JP); Kenji Aoki, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/817,812

(22) Filed: Mar. 13, 2020

(65) Prior Publication Data
US 2020/0362960 A1 Nov. 19, 2020

(30) Foreign Application Priority Data
May 16, 2019 (JP) .............................. JP2019-093210

(51) Int. Cl.
*F16H 59/18* (2006.01)
*F16H 61/00* (2006.01)
(Continued)

(52) U.S. Cl.
CPC ......... *F16H 61/0021* (2013.01); *F16H 59/14* (2013.01); *F16H 59/18* (2013.01);
(Continued)

(58) Field of Classification Search
CPC ......... Y10T 477/6895; Y10T 477/6936; Y10T 477/693754; F16H 61/0021;
(Continued)

(56) References Cited

U.S. PATENT DOCUMENTS 5,741,203 A * 4/1998 Nishio .................. F16H 61/061
477/120
8,265,840 B2 9/2012 Watanabe et al.
(Continued)

FOREIGN PATENT DOCUMENTS

JP 2003130204 A 5/2003
JP 2004316845 A 11/2004
(Continued)

*Primary Examiner* — Roger L Pang
(74) *Attorney, Agent, or Firm* — Buchanan Ingersoll & Rooney PC

(57) ABSTRACT

A transmission control device is used in an automatic transmission device including a transmission gear having friction coupling portions that are changed between a coupled state and an uncoupled state, and configuring transmission stages corresponding to a combination of the coupled state and the uncoupled state, and a hydraulic control device. The device includes: a determination unit determining a change in the transmission stage; and an output unit setting a target value of the hydraulic pressure, and outputting the target value to the hydraulic control device. In a case where one transmission stage is changed to another, the output unit increases the target value to a first value for a first friction coupling portion in the uncoupled state in the one transmission stage, thereafter, to a second value smaller than the first value and maintaining the uncoupled state, and thereafter, to a third value greater than the second value.

5 Claims, 15 Drawing Sheets

(51) Int. Cl.
*F16H 61/02* (2006.01)
*F16H 59/14* (2006.01)
*F16H 59/36* (2006.01)
*B60W 10/06* (2006.01)
*B60W 10/115* (2012.01)
*B60W 30/19* (2012.01)

(52) U.S. Cl.
CPC ......... *F16H 59/36* (2013.01); *F16H 61/0204* (2013.01); *B60W 10/06* (2013.01); *B60W 10/115* (2013.01); *B60W 30/19* (2013.01); *B60W 2510/0638* (2013.01); *B60W 2540/10* (2013.01); *B60W 2710/1083* (2013.01); *F16H 2059/147* (2013.01); *F16H 2059/366* (2013.01); *F16H 2200/0052* (2013.01); *F16H 2708/20* (2013.01); *F16H 2710/24* (2013.01)

(58) Field of Classification Search
CPC ...... F16H 61/0204; F16H 59/14; F16H 59/18; F16H 59/36; F16H 2710/24; F16H 2059/147; F16H 2056/366; F16H 2708/20; F16H 2061/062; F16H 61/061; F16H 61/686; B60W 10/06; B60W 10/115; B60W 30/19; B60W 2710/1083; B60W 2540/10; B60W 2510/0638

See application file for complete search history.

(56) References Cited

U.S. PATENT DOCUMENTS

| | | | |
|---|---|---|---|
| 2002/0035014 A1* | 3/2002 | Saito | ..................... F16H 61/061 477/143 |
| 2017/0254411 A1 | 9/2017 | Harada | |
| 2018/0023690 A1 | 1/2018 | Tsukamoto et al. | |
| 2019/0061738 A1* | 2/2019 | Goto | ..................... B60W 10/08 |
| 2020/0362961 A1 | 11/2020 | Harada et al. | |

FOREIGN PATENT DOCUMENTS

| | | | |
|---|---|---|---|
| JP | 2008111541 A | 5/2008 | |
| JP | 2013032793 A | 2/2013 | |
| JP | 2018112234 A | 7/2018 | |

* cited by examiner

|  | C1 | C2 | C3 | B1 | B2 |
|---|---|---|---|---|---|
| FIRST SPEED | O |  |  |  | O |
| SECOND SPEED | O |  |  | O |  |
| THIRD SPEED | O |  | O |  |  |
| FOURTH SPEED | O | O |  |  |  |
| FIFTH SPEED |  | O | O |  |  |
| SIXTH SPEED |  | O |  | O |  |
| R |  |  | O |  | O |

TRANSMISSION CONTROL DEVICE OF AUTOMATIC TRANSMISSION DEVICE

CROSS REFERENCE TO RELATED APPLICATIONS

This application is based on and claims priority under 35 U.S.C. § 119 to Japanese Patent Application 2019-093210, filed on May 16, 2019, the entire contents of which are incorporated herein by reference.

TECHNICAL FIELD

Embodiments of this disclosure relate to a transmission control device of an automatic transmission device.

BACKGROUND DISCUSSION

In the related art, a transmission control device is known which has a plurality of friction coupling portions changed between a coupled state and uncoupled state by using an applied hydraulic pressure. The transmission control device performs transmission control on a transmission gear configuring a plurality of transmission stages corresponding to a combination of the coupled state and the uncoupled state of the plurality of friction coupling portions.

JP 2004-316845A and JP 2008-111541A are examples in the related art.

In the related art, an actual hydraulic pressure follows an instruction hydraulic pressure with a delay. Accordingly, in order to shorten the delay in following the instruction hydraulic pressure, the instruction hydraulic pressure is set to be higher. However, when the instruction hydraulic pressure is set to be higher, for example, when a friction coupling portion in an uncoupled state is brought into a coupled state, a frictional force is generated in the friction coupling portion during a period in which the uncoupled state is maintained. For this reason, the friction coupling portion wears, thereby causing a problem in that durability of the friction coupling portion is degraded.

SUMMARY

A transmission control device according to an aspect is a transmission control device of an automatic transmission device which includes a transmission gear that has a plurality of friction coupling portions that are changed in accordance with a hydraulic pressure between a coupled state where a first coupling target and a second coupling target are coupled to each other by using a frictional force and an uncoupled state where the first coupling target and the second coupling target are uncoupled from each other, and that configure a plurality of transmission stages corresponding to a combination of the coupled state and the uncoupled state of the plurality of friction coupling portions, and a hydraulic control device that controls the hydraulic pressure. The transmission control device includes a determination unit that determines a change in the transmission stage, and an output unit that sets a target value of the hydraulic pressure, and outputs the target value to the hydraulic control device. In a case where the determination unit determines that one transmission stage is to be changed to another transmission stage, the output unit increases the target value to a first value for a first friction coupling portion which is the friction coupling portion in the uncoupled state in the one transmission stage, thereafter, the output unit decreases the target value to a second value which is smaller than the first value and which maintains the uncoupled state of the first friction coupling portion, and after the target value is decreased to the second value, the output unit temporarily increases the target value to a third value which is greater than the second value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be described. Configurations according to the embodiments disclosed below and operations and advantageous effects which are achieved by the configurations are merely examples. The embodiments disclosed here can be realized by configurations other than those disclosed in the following embodiments. According to the embodiments disclosed here, at least one of various advantageous effects (including derivative advantageous effects) obtained by the configurations can be obtained.

Overall Configuration

Figure 1:
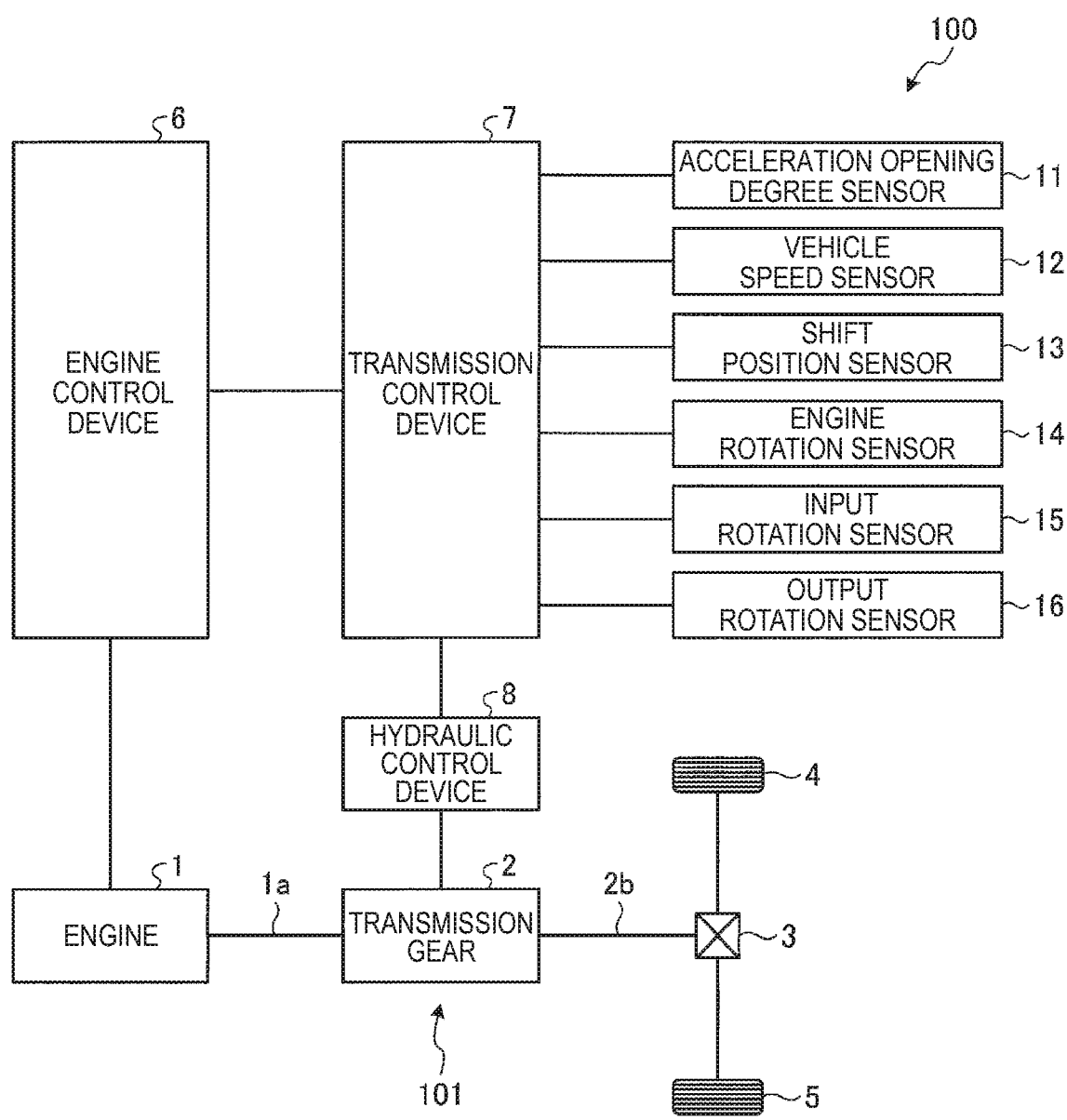
FIG. 1 is an exemplary diagram of a configuration of a vehicle according to an embodiment.

FIG. 1 is an exemplary diagram of a configuration of a vehicle 100 according to an embodiment. As illustrated in FIG. 1, as a drive system configuration, the vehicle 100 includes an engine 1, a transmission gear 2, a differential mechanism 3, and wheels 4 and 5. Power output from the engine 1 is transmitted to the wheels 4 and 5 via the transmission gear 2 and the differential mechanism 3. In the embodiment, an example will be described in which the vehicle 100 includes only the engine 1 as a drive source. However, the embodiment is not limited thereto. For example, vehicle 100 may be a hybrid vehicle including the engine 1 and a motor as a power sources, or may be an electric vehicle including only the motor as the drive source.

As a control system configuration, the vehicle 100 includes an engine control device 6, a transmission control device 7, and a hydraulic control device 8. The engine control device 6 is communicably connected to the engine 1, and controls the engine 1. The transmission control device 7 is communicably connected to the hydraulic control device 8, and controls the hydraulic control device 8. The hydraulic control device 8 controls a hydraulic pressure which is a pressure of oil in the transmission gear 2, in accordance with control of the transmission control device 7. That is, the transmission control device 7 controls the transmission gear 2 by controlling the hydraulic control device 8. The transmission gear 2, the transmission control device 7, and the hydraulic control device 8 configure an automatic transmission device 101. The oil is also called hydraulic oil.

As a detection system configuration, the vehicle 100 includes an acceleration opening degree sensor 11, a vehicle speed sensor 12, a shift position sensor 13, an engine rotation sensor 14, an input rotation sensor 15, and an output rotation sensor 16.

Each Configuration

The engine 1 is an internal combustion engine in which fuel is subjected to explosive combustion in a cylinder to generate rotational power (torque) by using thermal energy thereof. The engine 1 has an output shaft 1a connected to the transmission gear 2, and rotational power output from the output shaft 1a is input to the transmission gear 2.

The transmission gear 2 is disposed in a power transmission path between the engine 1 and the differential mechanism 3. The transmission gear 2 can decelerate the rotation of the engine 1, and can transmit the decelerated rotation to the differential mechanism 3.

Figures 2, 3:
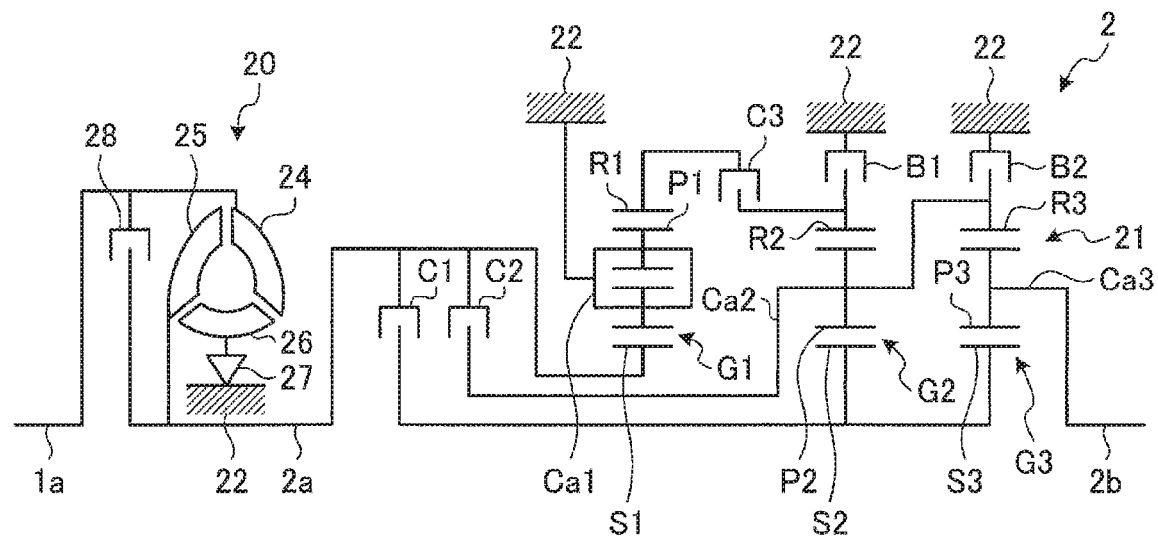
FIG. 2 is an exemplary skeleton diagram of a transmission gear according to the embodiment.
FIG. 3 is a view illustrating an example of an operation state of each friction coupling portion in each transmission stage of the transmission gear according to the embodiment.

FIG. 2 is an exemplary skeleton diagram of the transmission gear 2 according to the embodiment. As illustrated in FIG. 2, the transmission gear 2 includes a torque converter 20, a speed changer mechanism 21, and a case 22. The torque converter 20 and the speed changer mechanism 21 are accommodated in the case 22. The case 22 is supported by a vehicle body (not illustrated) of the vehicle 100.

The torque converter 20 is disposed in a power transmission path between the output shaft 1a of the engine 1 and an input shaft 2a of the speed changer mechanism 21. The torque converter 20 generates a torque amplifying action by using a mechanical action of a fluid. The torque converter 20 is also called a fluid transmission device.

The torque converter 20 has a pump impeller 24, a turbine runner 25, a stator 26, a one-way clutch 27, and a lock-up clutch 28.

The pump impeller 24 rotates integrally with the output shaft 1a of the engine 1. The pump impeller 24 rotates to feed the oil toward the turbine runner 25.

The turbine runner 25 rotates integrally with the input shaft 2a of the speed changer mechanism 21. The turbine runner 25 is rotatable relative to the pump impeller 24. The turbine runner 25 rotates by receiving the oil fed from the pump impeller 24. The turbine runner 25 rotates integrally with the pump impeller 24 since the lock-up clutch 28 is brought into a coupled state.

The stator 26 straightens a flow of the oil fed from the turbine runner 25, and returns the oil to the pump impeller 24 so as to generate the torque amplifying action. The stator 26 is fixed to the case 22 via the one-way clutch 27. The one-way clutch 27 allows the stator 26 to rotate only in one direction.

The lock-up clutch 28 is changed in accordance with a hydraulic pressure controlled by the hydraulic control device 8 between a coupled state where the pump impeller 24 and the turbine runner 25 are coupled to each other and an uncoupled state where the pump impeller 24 and the turbine runner 25 are uncoupled from each other. In a case where the lock-up clutch 28 is in the coupled state, there is no rotation speed difference between the output shaft 1a of the engine 1 and the input shaft 2a of the speed changer mechanism 21. The lock-up clutch 28 transmits the rotation of the output shaft 1a to the input shaft 2a of the speed changer mechanism 21 in the coupled state.

In a case where the lock-up clutch 28 is in the uncoupled state, the torque converter 20 generates the torque amplifying action due to a rotation difference between the pump impeller 24 to which the torque is input from the output shaft 1a and the turbine runner 25 which outputs the torque to the input shaft 2a.

The speed changer mechanism 21 configures a plurality of transmission stages corresponding to a plurality of the power transmission paths. The speed changer mechanism 21 switches the transmission stages by switching the power transmission paths. As members configuring the power transmission path, the speed changer mechanism 21 includes the input shaft 2a, a plurality of planetary gears G1 to G3, a plurality of friction coupling portions C1 to C3, B1, and B2, and an output shaft 2b.

The planetary gear G1 has a sun gear S11, a ring gear R1, a double pinion gear P1, and a carrier Ca1. The sun gear 51 rotates integrally with the input shaft 2a. The ring gear R1 is located on an outer peripheral side of the sun gear 51, and is connected to the friction coupling portion C3. The double pinion gear P1 is interposed between the sun gear 51 and the ring gear R1. The carrier Ca1 rotatably supports the double pinion gear P1, and is fixed to the case 22.

The planetary gear G2 has a sun gear S2, a ring gear R2, a pinion gear P2, and a carrier Ca2. The sun gear S2 is connected to the friction coupling portion C1. The ring gear R2 is located on an outer peripheral side of the sun gear S2, and is connected to the friction coupling portions C3 and B1. The pinion gear P2 is interposed between the sun gear S2 and the ring gear R2. The carrier Ca2 rotatably supports the pinion gear P2, and is connected to the friction coupling portion C2 and the friction coupling portion B2.

The planetary gear G3 has a sun gear S3, a ring gear R3, a pinion gear P3, and a carrier Ca3. The sun gear S3 is connected to the friction coupling portion C1. The ring gear R3 is located on an outer peripheral side of the sun gear S3, and is connected to the friction coupling portion B2. The ring gear R3 is connected to the carrier Ca2 of the planetary gear G2, and rotates integrally with the carrier Ca2. The pinion gear P3 is interposed between the sun gear S3 and the ring gear R3. The carrier Ca3 rotatably supports the pinion gear P3. The carrier Ca3 is connected to the output shaft 2b, and rotates integrally with the output shaft 2b.

The friction coupling portions C1 to C3, B1, and B2 can switch between a coupled state where two coupling targets of the speed changer mechanism 21 are coupled to each other by using a frictional force and an uncoupled state where the two coupling targets are uncoupled from each other. The coupled state is a coupled state where the two coupling targets are connected to each other by using the frictional force, and the uncoupled state is a separated state where the two coupling targets are separated from each other. The uncoupled state is also called a released state. The friction coupling portions C1 to C3 are called a clutch, and switch between coupling and uncoupling of two rotating elements serving as two coupling targets. The friction coupling portions B1 and B2 are called a brake, and switch between coupling and uncoupling of the rotating element and a stationary element which serve as two coupling targets. In an example illustrated in FIG. 2, configuration elements of the input shaft 2a and the planetary gears G1 to G3 are an example of the rotating elements serving as coupling and uncoupling targets of the friction coupling portions C1 to C3, B1, and B2. The case 22 is an example of the stationary element serving as coupling and uncoupling target of the friction coupling portions B1 and B2.

Specifically, in the example illustrated in FIG. 2, the friction coupling portion C1 switched between coupling and uncoupling of the input shaft 2a and the sun gear 51 of the planetary gear G1, and the planetary gear G2 and the sun gears S2 and S3 of the planetary gear G3. The friction coupling portion C2 switches between coupling and uncoupling of the input shaft 2a and the sun gear 51 of the planetary gear G1, and the carrier Ca2 of the planetary gear G2 and the ring gear R3 of the planetary gear G3. The friction coupling portion C3 switches between coupling and uncoupling of the ring gear R1 of the planetary gear G1 and the ring gear R2 of the planetary gear G2. The friction coupling portion B1 switches between coupling and uncoupling of the ring gear R2 of the planetary gear G2 and the case 22. The friction coupling portion B2 switches between coupling and uncoupling of the carrier Ca2 of the planetary gear G2, the ring gear R3 of the planetary gear G3, and the case 22.

FIG. 3 is a view illustrating an example of an operation state of the plurality of friction coupling portions C1 to C3, B1, and B2 in each transmission stage of the transmission gear 2 according to the embodiment. The speed changer mechanism 21 configures the plurality of transmission stages having mutually different transmission ratios (transmission ratio=rotation speed of the input shaft 2a/rotation speed of the output shaft 2b). Specifically, the speed changer mechanism 21 configures a transmission stage having first to sixth forward movement speed and a rearward movement speed. In other words, the speed changer mechanism 21 configures a transmission stage having six forward movement stages and one rearward movement stage. The transmission ratio of the transmission stage decreases in the order of the first forward movement speed to the sixth forward movement speed. The transmission stages are switched therebetween by a combination of the coupled state and the uncoupled state of the friction coupling portions C1 to C3, B1, and B2. In FIG. 2, the transmission stage having the first to sixth forward movement speeds is illustrated as a "first speed" to a "sixth speed", the transmission stage having the rearward movement speed is illustrated as "R", and the friction coupling portions C1 to C3, B1, and B2 are illustrated as "C1" to "C3", "B1", and "B2". In FIG. 2, in horizontal lines corresponding to the respective transmission stages having the first to sixth forward movement speeds and the rearward movement speed, the friction coupling portions C1 to C3, B1, and B2 marked with a circle are in the coupled state, and the friction coupling portions C1 to C1 having no mark are in the uncoupled state.

In the transmission stage at the first speed, the friction coupling portions C1 and B2 are in the coupled state, and the friction coupling portions C2, C3, and B1 are in the uncoupled state. In the transmission stage at the second speed, the friction coupling portions C1 and B1 are in the coupled state, and the friction coupling portions C2, C3, and B2 are in the uncoupled state. In the transmission stage at the third speed, the friction coupling portions C1 and C3 are in the coupled state, and the friction coupling portions C2, B1, and B2 are in the uncoupled state. In the transmission stage at the fourth speed, the friction coupling portions C1 and C2 are in the coupled state, and the friction coupling portions C3, B1, and B2 are in the uncoupled state. In the transmission stage at the fifth speed, the friction coupling portions C2 and C3 are in the coupled state, and the friction coupling portions C1, B1, and B2 are in the uncoupled state. In the transmission stage at the sixth speed, the friction coupling portions C2 and B1 are in the coupled state, and the friction coupling portions C1, C3, and B2 are in the uncoupled state. In the transmission stage at the rearward movement speed, the friction coupling portions C3 and B2 are in the coupled state, and the friction coupling portions C1, C2, and B1 are in the uncoupled state.

The transmission gear 2 switches the transmission stages by switching combinations of the rotating elements and the stationary elements by controlling the friction coupling portions C1 to C3, B1, and B2. Specifically, switching the transmission stages is controlled by the transmission control device 7 via the hydraulic control device 8. Hereinafter, in some cases, a friction coupling portion CB may be used as a generic term for the friction coupling portions C1 to C3, B1, and B2. In the transmission, the friction coupling portion CB changed from the coupled state to the uncoupled state will be referred to as a release-side friction coupling portion CB, and the friction coupling portion CB changed from the uncoupled state to the coupled state will be referred to as a coupling-side friction coupling portion CB.

Figure 4:
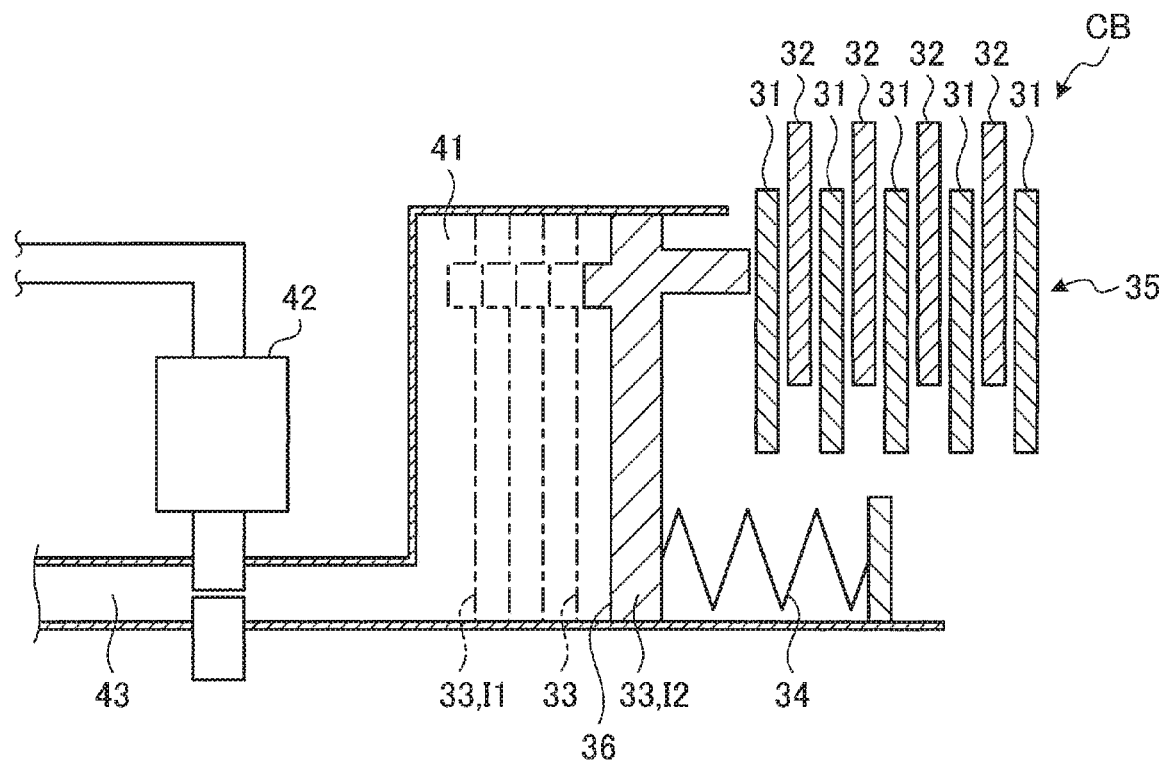
FIG. 4 is a view exemplarily and schematically illustrating a configuration of the friction coupling portion of the transmission gear according to the embodiment.

FIG. 4 is a view exemplarily and schematically illustrating a configuration of the friction coupling portion CB of the transmission gear 2 according to the embodiment. As illustrated in FIG. 4, the friction coupling portion CB has a plurality of inner friction plates 31, a plurality of outer friction plates 32, a piston 33, and a return spring 34.

The inner friction plate 31 is formed in an annular shape around a center axis. The inner friction plate 31 is coupled to one of two configuration elements of the transmission gear 2 not to be relatively rotatable, and is disposed to be movable with respect to one of the configuration elements in the axial direction of the center axis. The movement of the inner friction plate 31 in the axial direction of the center axis is restricted within a prescribed range.

The outer friction plate 32 is formed in an annular shape around the center axis. The outer friction plate 32 is coupled to the other of the two configuration elements of the transmission gear 2 not to be relatively rotatable, and is disposed movable with respect to the other of the configuration elements in the axial direction of the center axis. The movement of the outer friction plate 32 in the axial direction of the center axis is restricted within a prescribed range.

The plurality of inner friction plates 31 and the plurality of outer friction plates 32 are alternately located in the axial direction of the center axis. The plurality of inner friction plates 31 and the plurality of outer friction plates 32 configure a friction plate group 35. For example, the inner friction plates 31 are located in both ends of the friction plate group 35 in the axial direction.

The piston 33 is disposed at a position facing the friction plate group 35 in the axial direction. That is, in the axial direction of the center axis, the piston 33 faces the inner friction plate 31 located in one end of the friction plate group 35 in the axial direction. The piston 33 is disposed to be movable in the axial direction of the center axis. The piston 33 faces an oil chamber 41 disposed on a side opposite to the friction plate group 35 with respect to the piston. The piston 33 is pushed in a direction toward the friction plate group 35 by the pressure of the oil supplied to the oil chamber 41. The piston 33 configures a servo (hydraulic servo) 36.

The return spring 34 pushes the piston 33 in a direction along the axial direction of the center axis and away from the friction plate group 35. The return spring 34 is an example of an elastic member.

In the friction coupling portion CB having this configuration, in a state where the piston 33 is separated from the friction plate group 35, when a force of pushing the piston 33 by the hydraulic pressure in the oil chamber 41 is stronger than a force of pushing the piston 33 by the return spring 34, the piston 33 moves in the direction toward the friction plate group 35, comes into contact with the inner friction plate 31 located in one end of the friction plate group 35 in the axial direction, and pushes the inner friction plate 31. In this manner, the plurality of inner friction plates 31 and the plurality of outer friction plates 32 are integrated with each other by the frictional force generated between the inner friction plates 31 and the outer friction plates 32 which are adjacent to each other. Accordingly, the two coupling targets are coupled to each other in the transmission gear 2. On the other hand, in a state where the piston 33 and the friction plate group 35 are in contact with each other, when the force of pushing the piston 33 by the hydraulic pressure in the oil chamber 41 is weaker than the force of pushing the piston 33 by the return spring 34, the piston 33 moves in the direction away from the friction plate group 35, and is separated from the inner friction plate 31 located in one end of the friction plate group 35 in the axial direction. In this manner, no frictional force is generated between the plurality of inner friction plates 31 and the plurality of outer friction plates 32, and the two coupling targets are uncoupled (separated) from each other in the transmission gear 2.

Referring back to FIG. 1, the hydraulic control device 8 switches passages (oil passages) of the oil introduced from a hydraulic pump (not illustrated), and adjusts the hydraulic pressure in accordance with the control of the transmission control device 7. The hydraulic control device 8 outputs the oil to the friction coupling portions C1 to C3, B1, B2 and the lock-up clutch 28 which are selected in the transmission gear 2. The hydraulic control device 8 has a plurality of solenoid valves for switching the oil passages and adjusting the hydraulic pressure. For example, as illustrated in FIG. 4, the hydraulic control device 8 has a solenoid valve 42 that adjusts the hydraulic pressure of the oil chamber 41 of the friction coupling portion CB. For example, the solenoid valves 42 are respectively disposed in the friction coupling portions CB. The solenoid valve 42 is disposed in an oil passage 43 that communicates with the oil chamber 41. The solenoid valve 42 is a linear solenoid valve, for example. The hydraulic control device 8 is communicably connected to the transmission control device 7, and is controlled by the transmission control device 7.

The acceleration opening degree sensor 11 detects an acceleration opening degree corresponding to an operation amount of an accelerator member (not illustrated) such as an accelerator pedal and an accelerator lever. The vehicle speed sensor 12 detects the speed of vehicle 100. The shift position sensor 13 detects an operation position (parking, neutral, drive, upshift, and downshift positions) of a shift lever (not illustrated). The engine rotation sensor 14 detects the rotation speed of the engine 1, that is, the rotation speed of the output shaft 1a. Hereinafter, the rotation speed of the engine 1 will be referred to as an engine rotation speed. The input rotation sensor 15 detects the rotation speed of the input shaft 2a (turbine runner 25 of the torque converter 20) of the transmission gear 2. Hereinafter, the rotation speed of the turbine runner 25 will be referred to as a turbine rotation speed. The output rotation sensor 16 detects the rotation speed of the output shaft 2b of the transmission gear 2. The sensors (the acceleration opening degree sensor 11, the vehicle speed sensor 12, the shift position sensor 13, the engine rotation sensor 14, the input rotation sensor 15, and the output rotation sensor 16) are communicably connected to the transmission control device 7.

The engine control device 6 and the transmission control device 7 are respectively configured to serve as an electric control unit (ECU), for example. For example, the ECU has a micro controller unit (MCU), a power supply circuit, a driver (controller), an input/output conversion circuit, and an input/output protection circuit (all not illustrated). The ECU is configured to include an electronic component (not illustrated) mounted on a circuit board. The circuit board is accommodated in a case (not illustrated). The MCU has a central process unit (CPU), a main storage device (memory), a rewritable nonvolatile storage device, an interface (input/output device), a communication device, and a bus (all not illustrated). For example, the main storage device includes a read only memory (ROM) and a random access memory (RAM). In the MCU of the engine control device 6, the CPU performs arithmetic processing according to a program installed in the main storage device, and controls each unit of the engine 1. In the MCU of the transmission control device 7, the CPU performs arithmetic processing according to a program installed in the main storage device, and controls each unit of the hydraulic control device 8.

Figure 5:
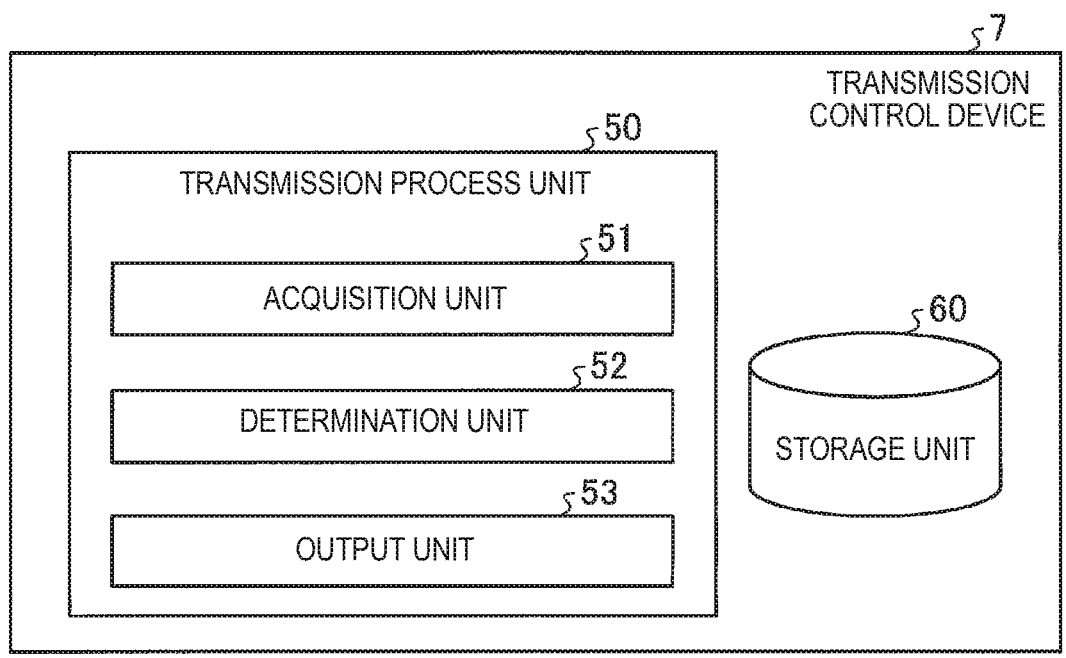
FIG. 5 is an exemplary block diagram of a configuration of a transmission control device according to the embodiment.
Figure 6:
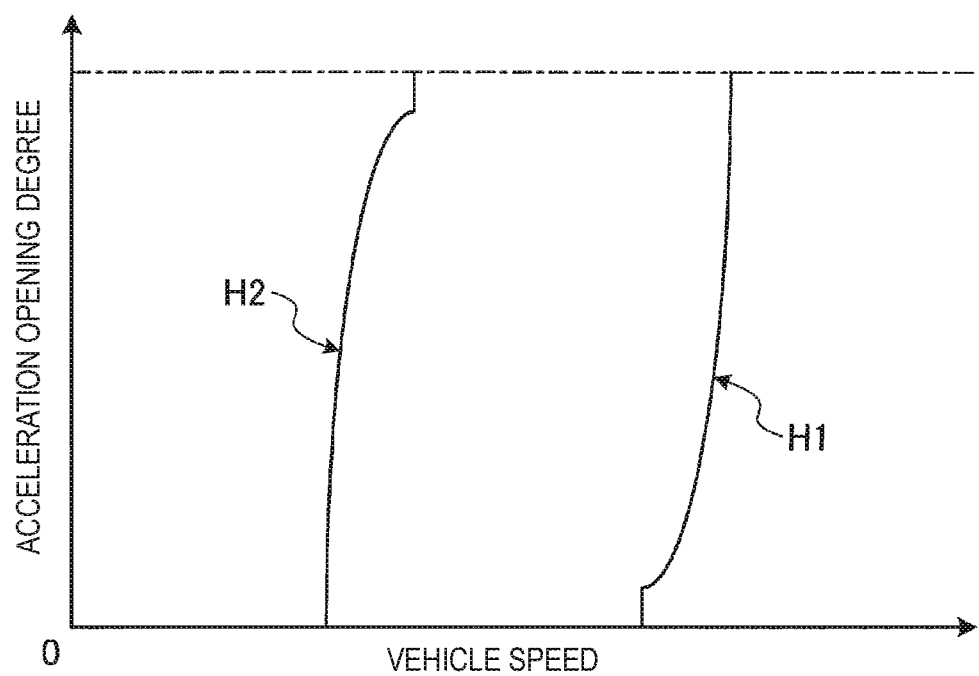
FIG. 6 is a view illustrating an example of a transmission line in the transmission control device according to the embodiment.

FIG. 5 is an exemplary block diagram of a configuration of the transmission control device 7 according to the embodiment. FIG. 6 is a view illustrating an example of transmission lines in the transmission control device 7 according to the embodiment. As illustrated in FIG. 5, the transmission control device 7 has a transmission process unit 50 that performs a transmission process. The transmission process unit 50 includes an acquisition unit 51, a determination unit 52, and an output unit 53. The transmission process unit 50 (the acquisition unit 51, the determination unit 52, and the output unit 53) is realized by the CPU of the transmission control device 7 executing a program installed in a main storage device. The transmission process unit 50 (the acquisition unit 51, the determination unit 52, and the output unit 53) may be configured to include hardware. The transmission control device 7 has a storage unit 60 that stores various types of information referred to by the transmission process unit 50. The storage unit 60 is disposed in a main storage device (memory) or a non-volatile storage device. For example, the storage unit 60 stores an upshift transmission line H1 and a downshift transmission line H2 which are illustrated in FIG. 6. Hereinafter, the upshift transmission line H1 and the downshift transmission line H2 may be collectively referred to as the transmission line H.

The acquisition unit 51 acquires various types of information. For example, the acquisition unit 51 acquires an acceleration opening degree detected by the acceleration opening degree sensor 11 (hereinafter, also referred to as an actual acceleration opening degree) from the acceleration opening degree sensor 11. The acquisition unit 51 acquires a vehicle speed detected by the vehicle speed sensor 12 (hereinafter, also referred to as an actual vehicle speed) from the vehicle speed sensor 12. The acquisition unit 51 acquires an operation position of a shift lever (not illustrated) detected by the shift position sensor 13, from the shift position sensor 13. The acquisition unit 51 acquires the rotation speed of the engine 1 detected by the engine rotation sensor 14 from the engine rotation sensor 14. The acquisition unit 51 acquires the rotation speed of the input shaft 2a (turbine runner 25 of the torque converter 20) of the transmission gear 2 detected by the input rotation sensor 15 from the input rotation sensor 15. The acquisition unit 51 acquires the rotation speed of the output shaft 2b of the transmission gear 2 detected by the output rotation sensor 16, from the output rotation sensor 16.

The determination unit 52 determines whether or not to perform transmission, based on various types of information acquired by the acquisition unit 51. In a case where the position of the shift lever (not illustrated) detected by the shift position sensor 13 is located at a set position of a manual transmission mode, that is, in a case where the transmission mode is set to the manual transmission mode, the determination unit 52 controls the transmission, based on a signal output from the shift position sensor 13.

In a case where the position of the shift lever detected by the shift position sensor 13 is located at a set position of an automatic transmission mode, the determination unit 52 determines whether or not to perform the transmission, based on the transmission line H, the actual acceleration opening degree, and the actual vehicle speed which are stored in the storage unit 60. For example, the transmission process unit 50 performs an upshift transmission process, in a case where the actual vehicle speed in an actual acceleration opening degree is equal to or higher than the vehicle speed corresponding to the actual acceleration opening degree of the upshift transmission line H1. The transmission process unit 50 performs a downshift transmission process, in a case where an actual vehicle speed is equal to or lower than the vehicle speed corresponding to the actual acceleration opening degree of the downshift transmission line H2. In a case where the actual vehicle speed is the vehicle speed between the upshift transmission line H1 and the downshift transmission line H2, the transmission process unit 50 maintains a current transmission stage.

The output unit 53 outputs an instruction corresponding to the transmission to the hydraulic control device 8, in a case where the determination unit 52 determines the transmission. Specifically, the output unit 53 outputs a target value of the hydraulic pressure applied to the friction coupling portion CB, that is, an instruction hydraulic pressure which is a target value of the hydraulic pressure of the oil chamber 41, to the hydraulic control device 8.

Figure 7:
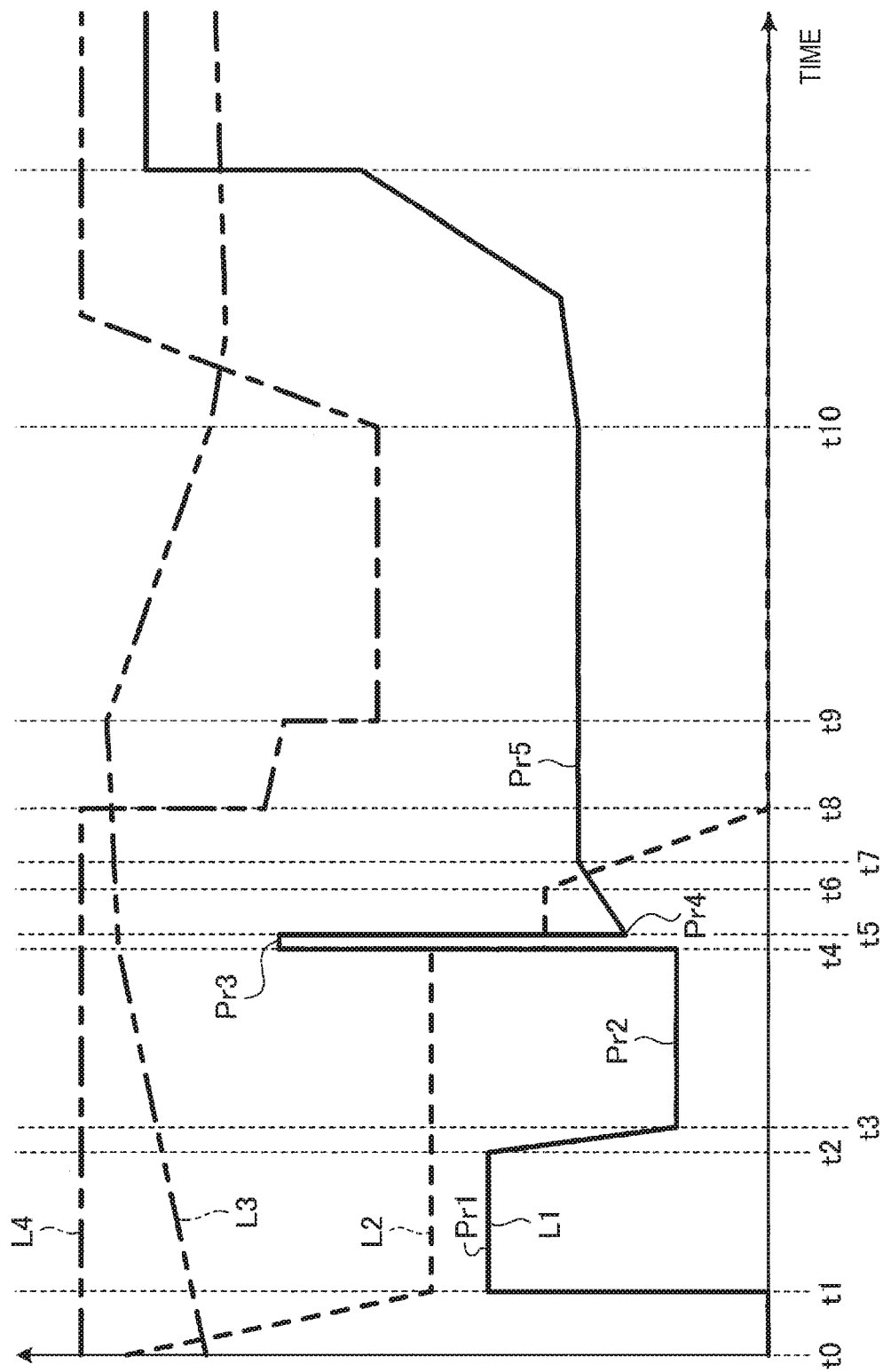
FIG. 7 is a timing chart illustrating an example of a transmission process performed by a transmission process unit of the transmission control device according to the embodiment.

FIG. 7 is a timing chart of an example of the transmission process performed by the transmission process unit 50 of the transmission control device 7 according to the embodiment.

Next, the transmission process performed by the transmission process unit 50 of the transmission control device 7 will be described with reference to FIG. 7. As an example, the transmission process in a case where the transmission stage is shifted (upshifted) from the first speed to the second speed. In this case, the friction coupling portion B2 is the release-side friction coupling portion CB, and the friction coupling portion B1 is the coupling-side friction coupling portion CB. The coupling-side friction coupling portion CB is an example of a first friction coupling portion. A line L1 illustrated in FIG. 7 indicates an instruction hydraulic pressure for the coupling-side friction coupling portion CB (hereinafter, also referred to as a release-side instruction hydraulic pressure). A line L2 illustrated in FIG. 7 indicates an instruction hydraulic pressure for the release-side friction coupling portion CB (hereinafter, also referred to as a coupling-side instruction hydraulic pressure). A line L3 illustrated in FIG. 7 indicates the rotation speed of the turbine runner 25. A line L4 in FIG. 7 indicates an engine torque instruction value. The engine torque instruction value is a target torque of the engine 1, and is output from the transmission process unit 50 to the engine control device 6, for example. A horizontal axis in FIG. 7 indicates a lapse of time. A vertical axis in FIG. 7 indicates the release-side instruction hydraulic pressure, the coupling-side instruction hydraulic pressure, the rotation speed of the turbine runner 25, and a magnitude of the engine torque instruction value. The values increase upward in FIG. 7. FIG. 7 illustrates an example in which the determination unit 52 determines to perform the transmission from the first speed to the second speed at time to.

In a case where the determination unit 52 determines to perform the transmission from the first speed to the second speed (time t0), the output unit 53 starts the control. Specifically, the determination unit 52 gradually reduces the release-side instruction hydraulic pressure (times t0 to t8). The output unit 53 gradually lowers the release-side instruction hydraulic pressure during times t0 to t1, maintains the pressure to be constant during times t1 to t4, lowers the pressure at time t4, maintains the pressure to be constant during times t4 to t6, and gradually lowers the pressure during times t6 to t8.

On the other hand, the output unit 53 starts pre-charge control for the coupling-side friction coupling portion CB from time t1. Specifically, the output unit 53 raises a coupling-side instruction hydraulic pressure Pr to a coupling-side instruction hydraulic pressure Pr1, and maintains the coupling-side instruction hydraulic pressure Pr1 until time t2. In this manner, as illustrated in FIG. 3, the piston 33 moves from a position 11 in a direction toward the friction plate group 35 (rightward in FIG. 3). The coupling-side instruction hydraulic pressure Pr1 is an example of a first value.

Referring back to FIG. 7, next, the output unit 53 performs standby pressure control on the coupling-side friction coupling portion CB. Specifically, during times t2 to t3, the output unit 53 gradually lowers the coupling-side instruction hydraulic pressure Pr from the coupling-side instruction hydraulic pressure Pr1 to a coupling-side instruction hydraulic pressure Pr2 lower than the coupling-side instruction hydraulic pressure Pr1. Thereafter, the output unit 53 maintains the coupling-side instruction hydraulic pressure Pr2 until time t4 (standby pressure control). The coupling-side instruction hydraulic pressure Pr2 is a hydraulic pressure at which the piston 33 does not move to the friction plate group 35 side (rightward in FIG. 3) beyond a position 12 even after a lapse of time. That is, the coupling-side instruction hydraulic pressure Pr2 is a hydraulic pressure at which the uncoupled state of the coupling-side friction coupling portion CB is maintained. The coupling-side instruction hydraulic pressure Pr2 is also called a standby pressure. In this manner, as illustrated in FIG. 3, during times t2 to t3, the piston 33 stops at the position 12. The position 12 is a position where the piston 33 and the friction plate group 35 are separated from each other.

Next, the output unit 53 performs pin charge control on the coupling-side friction coupling portion CB (times t4 to t5). Specifically, the output unit 53 raises the coupling-side instruction hydraulic pressure Pr to a coupling-side instruction hydraulic pressure Pr3, and maintains the coupling-side instruction hydraulic pressure Pr3 until time t5. That is, the output unit 53 temporarily increases the coupling-side instruction hydraulic pressure Pr. As an example, the coupling-side instruction hydraulic pressure Pr3 is higher than the coupling-side instruction hydraulic pressure Pr1. The start time of the pin charge control (time t4) is a predetermined time after time t3. The coupling-side instruction hydraulic pressure Pr3 may be equal to or lower than the coupling-side instruction hydraulic pressure Pr1. A time (period) from times t4 to t5 is shorter than a time (period) from times t1 to t2.

Next, during times t5 and t7, the output unit 53 gradually increases the coupling-side instruction hydraulic pressure Pr from a coupling-side instruction hydraulic pressure Pr4 to a coupling-side instruction hydraulic pressure Pr5. For example, the coupling-side instruction hydraulic pressure Pr4 is a value by which the frictional force of the friction coupling portion CB is not generated. The coupling-side instruction hydraulic pressure Pr4 is not limited to the above-described example. For example, the coupling-side instruction hydraulic pressure Pr4 may be a value by which the frictional force of the friction coupling portion CB is not generated only for a predetermined period. In this case, the frictional force of the friction coupling portion CB may be generated after the predetermined period. That is, for example, the coupling-side instruction hydraulic pressure Pr4 is a value by which the frictional force of the friction coupling portion CB is not generated at least for the predetermined period. The above-described predetermined period can be set as appropriate. For example, the coupling-side instruction hydraulic pressure Pr5 is a hydraulic pressure at which an inertia phase can start. In other words, the coupling-side instruction hydraulic pressure Pr5 is a hydraulic pressure which is equal to or higher than the coupling-side instruction hydraulic pressure Pr4, and at which the frictional force of the friction coupling portion CB is generated. During times t7 to t10, the output unit 53 maintains the coupling-side instruction hydraulic pressure Pr5. During times t4 and t9, the piston 33 starts again to move in the direction toward the friction plate group 35. Then, the piston 33 comes into contact with the friction plate group 35, and presses the friction plate group 35. In this manner, the frictional force is generated between the inner friction plate 31 and the outer friction plate 32. Here, a position where the piston 33 comes into contact with the friction plate group 35 is also called a piston touch position. As the piston 33 further moves from the piston touch position to the friction plate group 35 side, the pressing force acting on the friction plate group 35 increases. A time point at which the piston 33 completely moves to the friction plate group 35 side, that is, a time point at which the piston 33 cannot move to the friction plate group 35 side is an activating time point (re-activating time point) of the servo 36. At this time, the whole hydraulic pressure in the oil chamber 41 is used for fastening the inner friction plate 31 and the outer friction plate 32. Time t9 during times t7 and t10 is a time at which the transmission process unit 50 detects inertia phase start. That is, in this example, a torque phase is before time t9. Next, after time t10, the output unit 53 gradually increases the coupling-side instruction hydraulic pressure Pr. Here, an engine torque instruction value (line L4 illustrated in FIG. 7) is lowered to a predetermined torque during times t8 to t9 at which the pressure is reduced in the release-side instruction hydraulic pressure. In this manner, the inertia phase start can be promoted. Furthermore, at time t9 at which the transmission process unit 50 detects the inertia phase start, the engine torque instruction value (line L4 illustrated in FIG. 7) is further lowered. In this manner, a progress of the inertia phase can be promoted.

According to the above-described control, a state between the release-side friction coupling portion CB and the coupling-side friction coupling portion CB is changed from the torque phase to the inertia phase, thereby completing the transmission.

Figure 8:
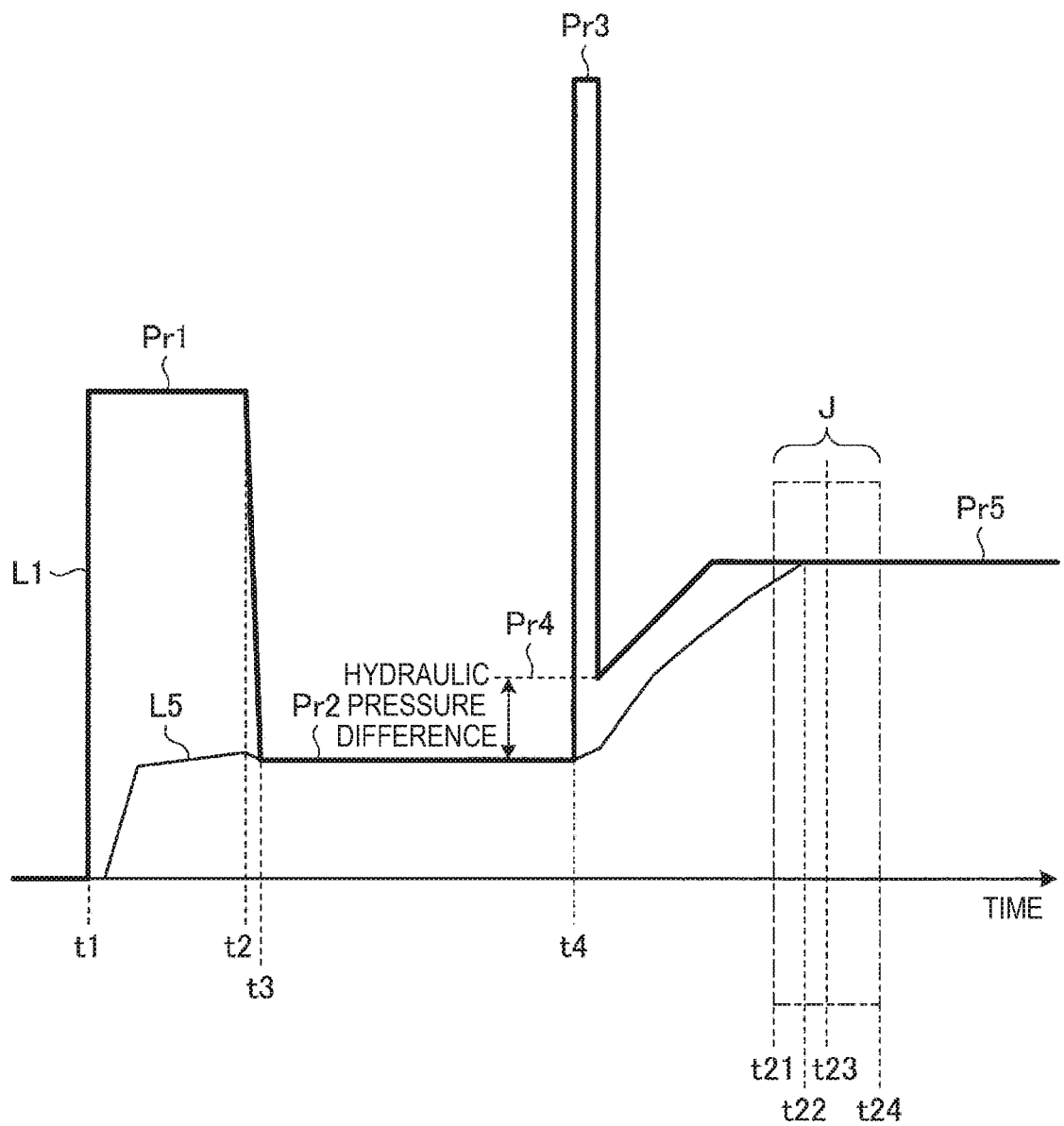
FIG. 8 is a timing chart illustrating an example of an instruction hydraulic pressure and an actual hydraulic pressure in the transmission process performed by the transmission process unit of the transmission control device according to the embodiment.

FIG. 8 is a timing chart illustrating an example of the instruction hydraulic pressure (coupling-side instruction hydraulic pressure) and the actual hydraulic pressure in the transmission process performed by the transmission process unit 50 of the transmission control device 7 according to the embodiment. As in FIG. 7, the line L1 illustrated in FIG. 8 indicates the coupling-side instruction hydraulic pressure. A line L5 illustrated in FIG. 8 indicates the hydraulic pressure of the oil chamber 41 which acts on the coupling-side friction coupling portion CB (hereinafter, referred to as the actual hydraulic pressure). Time t23 illustrated in FIG. 8 is a target activating time of the servo 36, that is, a target time for activating the movement of the piston 33. Time t22 illustrated in FIG. 8 is a time at which the servo 36 is actually activated, that is, a time at which the piston 33 actually starts to move. In the embodiment, in order to ensure activating performance of the servo 36 with respect to the inertia phase start hydraulic pressure without depending on the coupling-side instruction hydraulic pressure Pr2 (standby pressure), the coupling-side instruction hydraulic pressure Pr4 (hereinafter, also referred to as pin charge lower pressure) is set so that the servo 36 is actually activated within a range J between predetermined time t21 and time t24.

Figure 9:
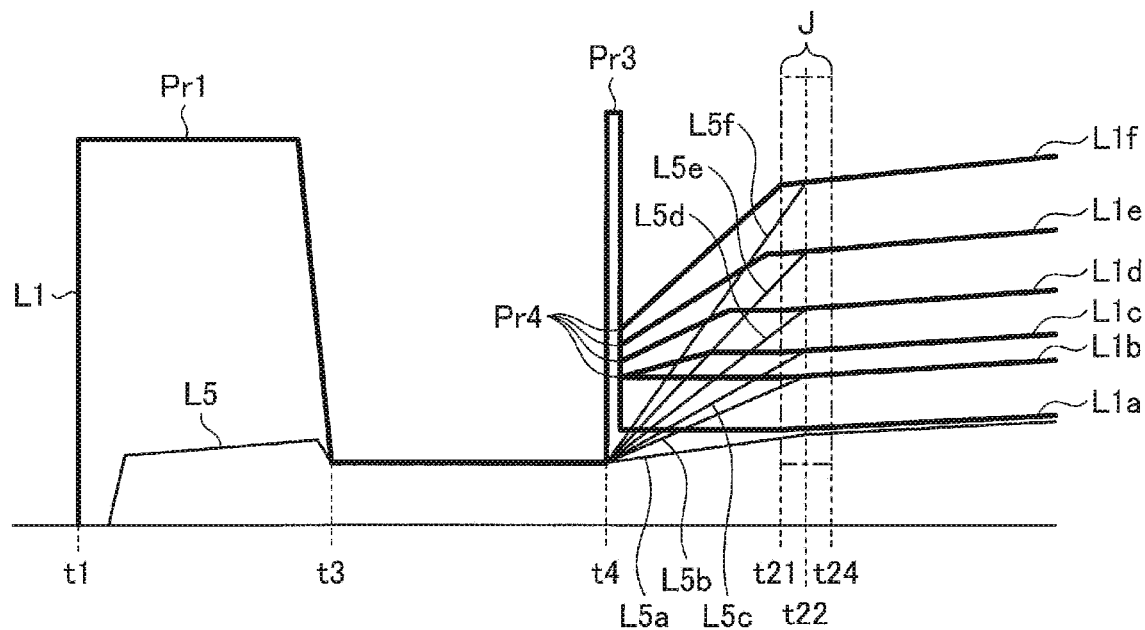
FIG. 9 is a timing chart illustrating an example of an instruction hydraulic pressure and an actual hydraulic pressure which correspond to an input torque in the transmission process performed by the transmission process unit of the transmission control device according to the embodiment.

FIG. 9 is a timing chart illustrating an example of the instruction hydraulic pressure corresponding to the input torque and the actual hydraulic pressure in the transmission process performed by the transmission process unit 50 of the transmission control device 7 according to the embodiment. Lines L1a to L1f illustrated in FIG. 9 are the coupling-side instruction hydraulic pressures corresponding to the input torques from the engine 1 to the transmission gear 2, and the input torque from the engine 1 decreases in the order of the lines L1a to L1f. Lines L5a to L5f illustrated in FIG. 9 are the actual hydraulic pressures corresponding to the coupling-side instruction hydraulic pressures indicated by the lines L1a to L1f. As illustrated in FIG. 9, in the embodiment, the output unit 53 sets the coupling-side instruction hydraulic pressure Pr4 (pin charge lower pressure) in accordance with the input torque from the engine 1 to the transmission gear 2. Specifically, the output unit 53 sets the coupling-side instruction hydraulic pressure Pr4 (pin charge lower pressure) to be higher, as the input torque from the engine 1 to the transmission gear 2 increases. Setting the coupling-side instruction hydraulic pressure Pr4 by the output unit 53 in accordance with the input torque from the engine 1 to the transmission gear 2 is not limited to the above-described example. Here, for example, in a case of the lines L1b to L1f, the coupling-side instruction hydraulic pressure Pr4 can be set to a value by which the frictional force of the friction coupling portion CB is not generated. In a case of the line L1a, that is, in a case where the coupling-side instruction hydraulic pressure Pr4 and the coupling-side instruction hydraulic pressure Pr5 are the same as each other, the coupling-side instruction hydraulic pressure Pr4 can be set to a value at which the frictional force of the friction coupling portion CB is not generated only for a predetermined period.

Figure 10:
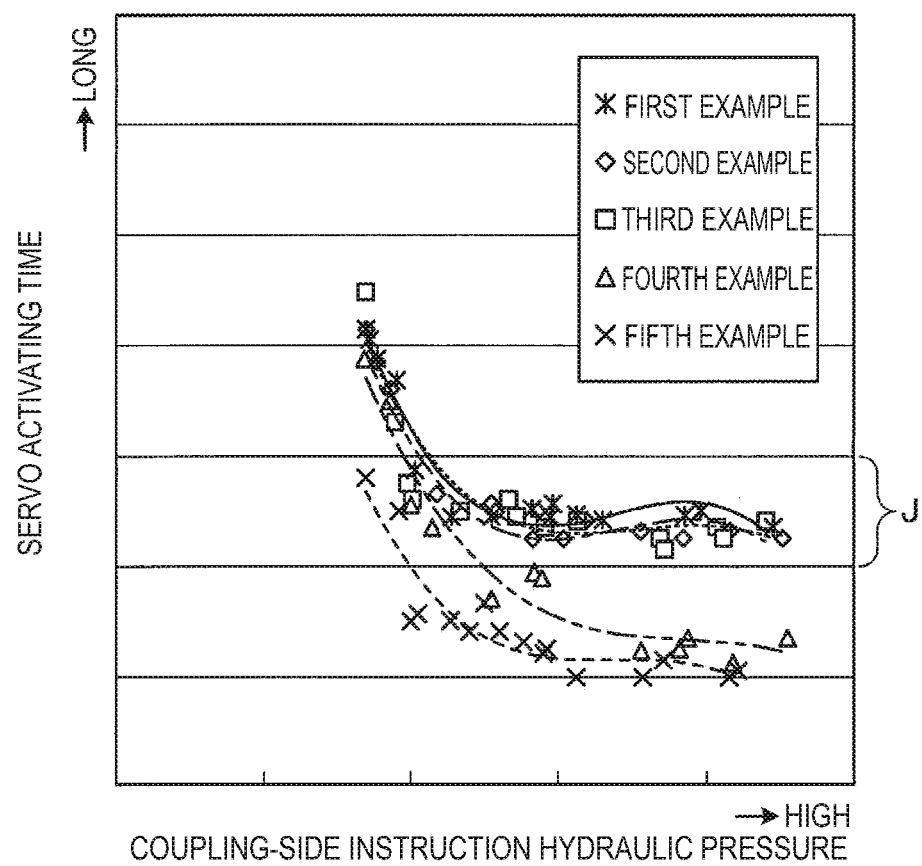
FIG. 10 is a view illustrating a relationship between a coupling-side instruction hydraulic pressure after a pin charge control and a servo activating time.

FIG. 10 is a view illustrating a relationship between the coupling-side instruction hydraulic pressure and a servo activating time according to the embodiment. A horizontal axis in FIG. 10 is the coupling-side instruction hydraulic pressure Pr5, and a vertical axis in FIG. 10 is an activating time of the servo 36. FIG. 9 illustrates the relationship between the coupling-side instruction hydraulic pressure and the servo activating time after each pin charge control in first to fifth examples. In the first to fifth examples, magnifications of the coupling-side instruction hydraulic pressure Pr4 (pin charge lower pressure) to the coupling-side instruction hydraulic pressure Pr2 (standby pressure) are respectively 1.2 times, 1.4 times, and 1.6 times, and 2.0 times. The range J of the servo activating time in FIG. 9 is a target servo activating time range. As will be understood from FIG. 9, the magnifications of the coupling-side instruction hydraulic pressure Pr4 (pin charge lower pressure) with respect to the coupling-side instruction hydraulic pressure Pr2 (standby pressure) are set (changed) in accordance with a magnitude of the coupling-side instruction hydraulic pressure Pr5. In this manner, the servo activating time can be set within the target servo activating time range in accordance with the magnitude of the coupling-side instruction hydraulic pressure Pr5.

In a process in FIG. 7, the control of the coupling-side instruction hydraulic pressure includes controls such as pre-charge control, standby pressure control, torque phase control, inertia phase control, and completion control. The control of the release-side instruction hydraulic pressure includes transmission initial standby control, release control, and release standby control. Each control will be described in detail with reference to an example in FIG. 11.

As an example, the above-described process in FIG. 7 is performed only in a case where the actual acceleration opening degree is smaller than a prescribed threshold. For example, the threshold is 80%, but may be other values.

Next, a transmission process performed by the transmission process unit 50 of the transmission control device 7 in a case where the actual acceleration opening degree is equal to or greater than the prescribed threshold will be described with reference to FIG. 11. As an example, as in the case in FIG. 7, the transmission process in a case where the transmission stage is shifted (upshifted) from the first speed to the second speed will be described. The process in FIG. 11 is different from the process in FIG. 7 in that transmission progress determination is performed.

Figure 11:
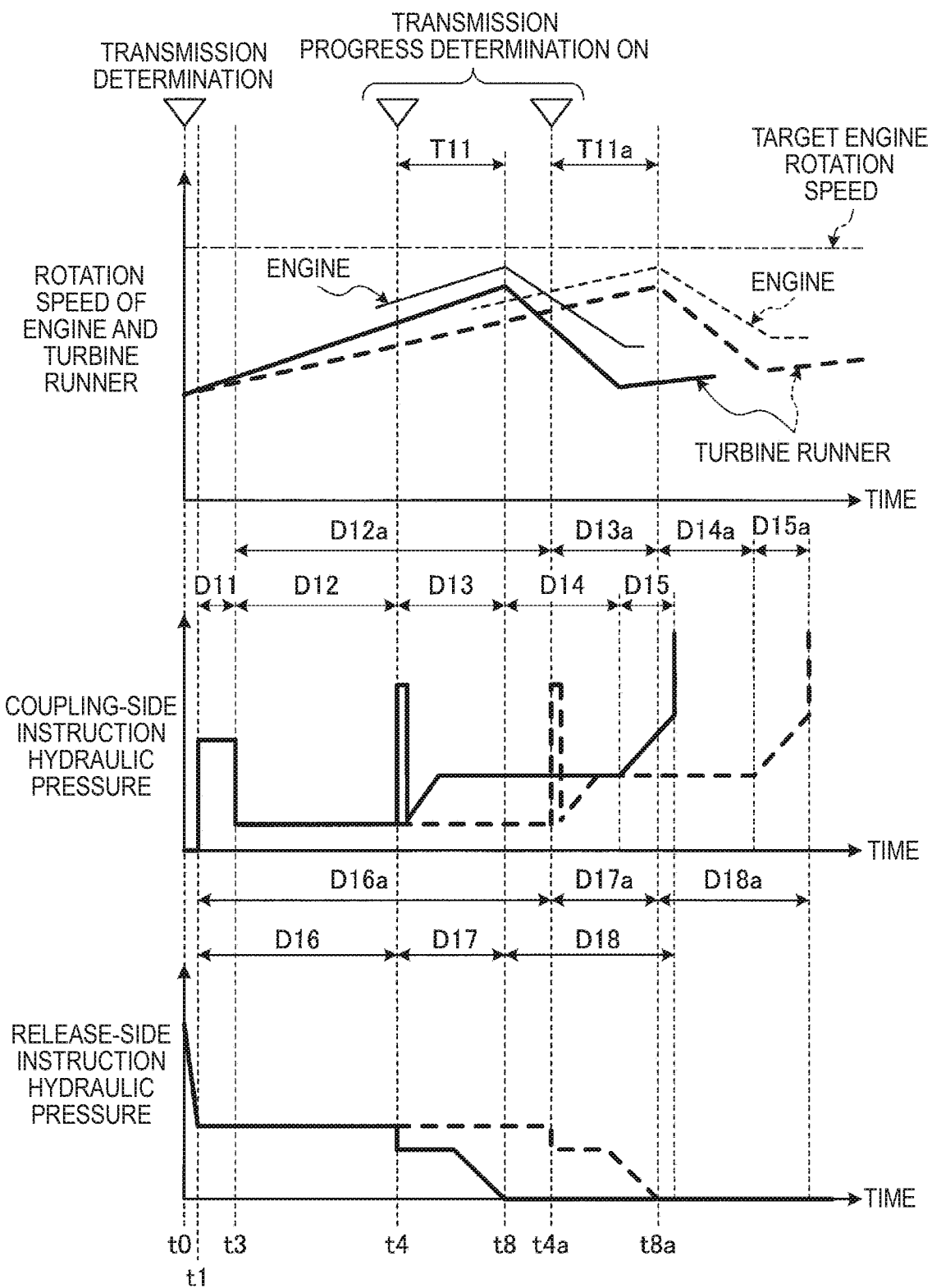
FIG. 11 is a timing chart illustrating an example of the instruction hydraulic pressure and a rotation speed of an engine and a turbine runner in the transmission process performed by the transmission process unit of the transmission control device according to the embodiment.

FIG. 11 is a timing chart illustrating an example of the instruction hydraulic pressure and the rotation speeds of the engine and the turbine runner in the transmission process performed by the transmission process unit 50 of the transmission control device 7 according to the embodiment.

FIG. 11 illustrates the release-side instruction hydraulic pressure, the coupling-side instruction hydraulic pressure, and the rotation speeds of the engine 1 and the turbine runner 25 in two states where total weights of the vehicle 100 are different from each other. Each solid line illustrated in FIG. 11 indicates a case where the total weight of the vehicle 100 is a first weight, and a dotted line illustrated in FIG. 11 indicates a case where the total weight of the vehicle 100 is a second weight which is heavier than the first weight. For example, in a case where the vehicle 100 is a truck, the first weight shows a state where no cargo is loaded on a cargo bed, and the second weight shows a state where a cargo is loaded on the cargo bed. Hereinafter, a case where the total weight of the vehicle 100 is the first weight will be referred to as a non-loading case of the vehicle 100, and a case where the total weight of the vehicle 100 is the second weight will be referred to as a loading case of the vehicle 100. Times in FIG. 11 are the same as the times described in FIG. 7. However, times t4 and t8 are times in the non-loading case of the vehicle 100, and times t4a and t8a are times in the loading case of the vehicle 100, which correspond to times t4 and t8.

In the control of the coupling-side instruction hydraulic pressure, the transmission process unit 50 performs the pre-charge control during a period D11, performs the standby pressure control during periods D12 and D12a, performs the torque phase control during periods D13 and D13a, performs the inertia phase control during periods D14 and D14a, and performs the completion control during periods D15 and D15a. The pre-charge control is a control phase for filling the oil chamber 41 (clutch pack) with oil. The standby pressure control is a control phase for starting movement (stroke) of the piston 33 of the coupling-side friction coupling portion CB and holding the piston 33 at a prescribed position. The prescribed position is a position where the piston 33 does not come into contact with the friction plate group 35, and is a position facing the friction plate group 35 with a relatively small gap. The torque phase control is a control phase for proceeding to torque sharing between the release-side friction coupling portion CB and the coupling-side friction coupling portion CB. In other words, the torque phase control is the control for promoting the transmission to a target transmission stage while assigning torque capacity to the coupling-side friction coupling portion CB. The torque phase control includes the pin charge control. The inertia phase control is a control phase for proceeding to a transmission ratio (gear ratio) in the control when the turbine rotation speed fluctuates. The completion control is the control for completing the transmission control, and is the control until the inertia is completely changed and the friction coupling portion CB reaches a steady state.

In the control of the release-side instruction hydraulic pressure, the transmission process unit 50 performs the transmission initial standby control during periods D16 and D16a, performs the release control during periods D17 and D17a, and performs the release standby control during periods D18 and D18a. The transmission initial standby control is a control phase for maintaining a minimum hydraulic pressure that does not cause slippage (sliding between the inner friction plate 31 and the outer friction plate 32) in the release-side friction coupling portion CB. The release control is a control phase for lowering (extracting oil) of the hydraulic pressure of the release-side friction coupling portion CB as the coupling-side friction coupling portion CB has the assigned torque capacity, in order to switch between the release-side friction coupling portion CB and the coupling-side friction coupling portion CB. The release standby control is a control phase for waiting until the coupling-side friction coupling portion CB is completely fastened (coupled state) after the release-side friction coupling portion CB is completely released (uncoupled state).

Times T11 and 11a illustrated in FIG. 11 are estimated times until the inertia phase starts after transmission progress determination (to be described later) is turned ON.

In a case where the transmission process unit 50 determines the transmission, based on the transmission line H, the transmission process unit 50 starts the transmission control irrespective of the acceleration of the vehicle 100 (t0). That is, the transmission process unit 50 performs the pre-charge control and the standby pressure control. Next, the transmission process unit 50 performs the transmission progress determination. The transmission progress determination is performed to determine whether or not to proceed to the subsequent process from the standby pressure control. The determination is made based on an inertia phase start time, a turbine rotation speed change rate, and a slip amount. The inertia phase start time is a time from a torque phase control start time (time t4) to an estimated inertia phase change start time (time t8). The turbine rotation speed change rate is a change rate of the rotation speed of the turbine runner 25, and the slip amount is a difference between the rotation of the engine 1 and the rotation of the turbine runner 25. The determination that proceeds to the subsequent process from the standby pressure control will be referred to as "ON", and the determination that does not proceed to the subsequent process from the standby pressure control, that is, the determination to continuously perform the standby pressure control, will be referred to as "OFF". In a state where the standby pressure control is performed, the transmission process unit 50 performs the standby pressure control until the transmission progress determination is turned ON. In this state, the transmission stage is maintained at the first speed. Then, in a case where the transmission progress determination is turned ON, the transmission process unit 50 performs the control subsequent to the torque phase control. In this manner, the transmission is performed to start the inertia phase at a target engine rotation speed which is a target rotation speed of the engine 1.

As will be understood from the above description, in the example in FIG. 11, the start time (t4) of the pin charge control is not set in advance. After time t3, the determination unit 52 determines the start time of the pin charge control (torque phase control) during a period (hereinafter, also referred to as a standby pressure period) in which the coupling-side instruction hydraulic pressure Pr is set to the coupling-side instruction hydraulic pressure Pr2 (standby pressure).

Next, a process performed by the transmission process unit 50 of the transmission control device 7 in the example in FIG. 11 will be described in detail with reference to FIGS. 12 to 16.

Figure 12:
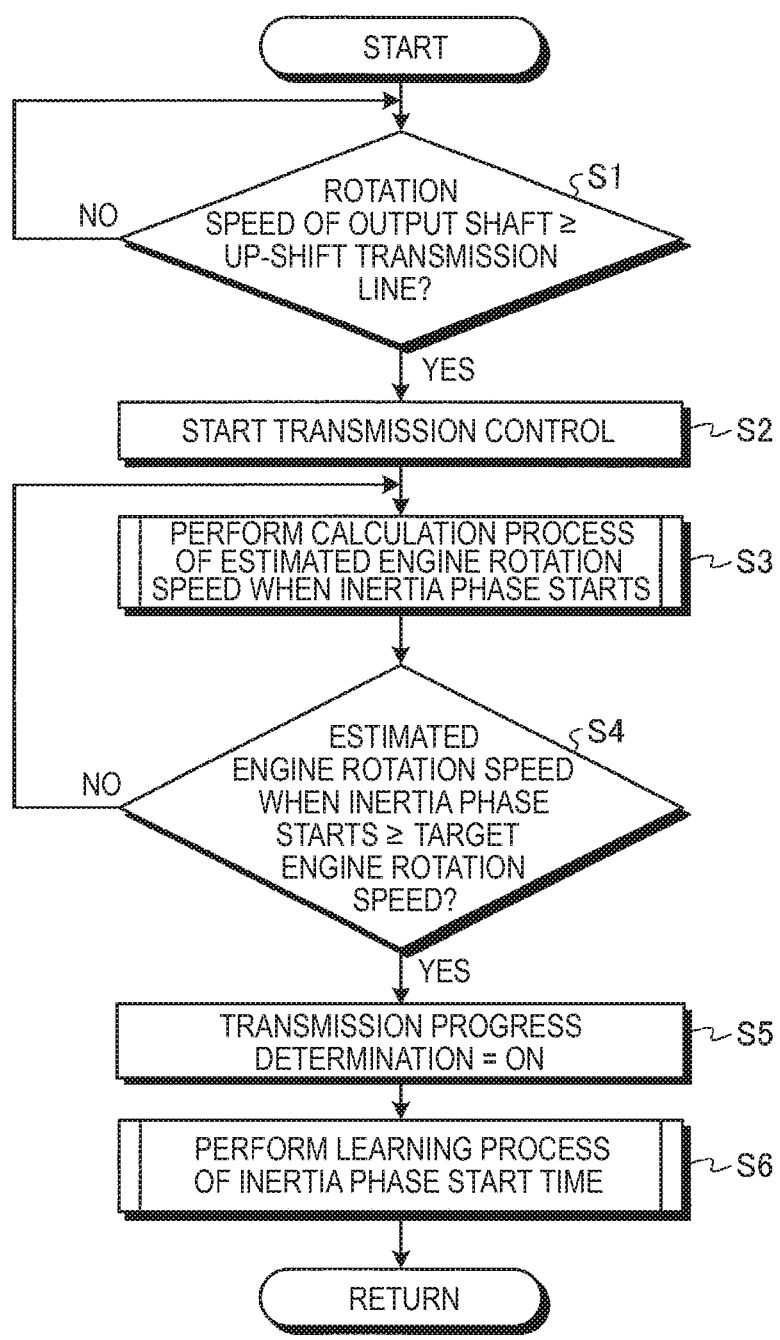
FIG. 12 is a flowchart illustrating a partial example of the transmission process performed by the transmission process unit of the transmission control device according to the embodiment.

FIG. 12 is a flowchart illustrating an example of a portion (transmission progress determination) of the transmission process performed by the transmission process unit 50 of the transmission control device 7 according to the embodiment. As illustrated in FIG. 12, the determination unit 52 of the transmission process unit 50 in the transmission control device 7 determines whether or not the rotation speed of the output shaft 2b exceeds the upshift transmission line H1 (S1). In a case where the rotation speed of the output shaft 2b does not exceed the upshift transmission line H1 (S1: No), the determination unit 52 repeats the process of S1. In a case where the determination unit 52 determines that the rotation speed of the output shaft 2b exceeds the upshift transmission line H1 (S1: Yes), that is, in a case where the determination unit 52 determines to perform the transmission, the transmission process unit 50 starts the transmission control (S2).

When the transmission control starts, the transmission process unit 50 performs a calculation process of the estimated engine rotation speed when the inertia phase starts (S3).

Figure 13:
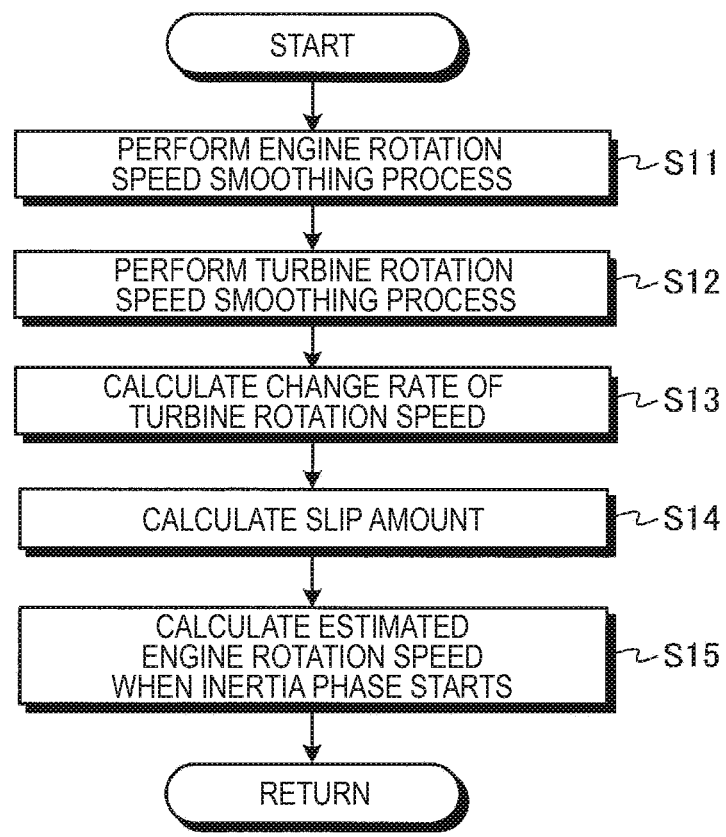
FIG. 13 is a flowchart illustrating a calculation process of an estimated engine rotation speed when an inertia phase starts, which is performed by the transmission process unit of the transmission control device according to the embodiment.

The calculation process of the estimated engine rotation speed when the inertia phase starts will be described with reference to FIG. 13. FIG. 13 is a flowchart illustrating the calculation process of the estimated engine rotation speed when the inertia phase starts, which is performed by the transmission process unit 50 of the transmission control device 7 according to the embodiment. As illustrated in FIG. 13, the transmission process unit 50 performs an engine rotation speed smoothing process for smoothing the engine rotation speed (S11). Next, the transmission process unit 50 performs a turbine rotation speed smoothing process for smoothing the turbine rotation speed (S12). In S11 and S12, a low-pass filter process may be performed instead of the smoothing process.

Next, the transmission process unit 50 calculates a change rate of the turbine rotation speed (turbine rotation speed change rate) from the turbine rotation speed smoothed in S12 (S13). Next, the transmission process unit 50 calculates the slip amount from the engine rotation speed smoothed in S11 and the turbine rotation speed smoothed in S12 (S14). The slip amount is a difference between the rotation of the engine 1 and the rotation of the turbine runner 25. Next, the transmission process unit calculates the estimated engine rotation speed when the inertia phase starts (S15). Specifically, the transmission process unit calculates the estimated engine rotation speed when the inertia phase starts by using Equation (1) below.

$$\text{Estimated engine rotation speed when the inertia phase starts} = (\text{Smoothed turbine rotation speed}) + (\text{Turbine rotation speed change rate}) \times (\text{Inertia phase start time}) + (\text{Slip amount}) \quad (1)$$

Referring back to FIG. 12, when the transmission process unit 50 performs the calculation process of the estimated engine rotation speed when the inertia phase starts (S3), the transmission process unit 50 determines whether or not the calculated estimated engine rotation speed when the inertia phase starts exceeds the target engine rotation speed (S4). In a case where the transmission process unit 50 determines that the estimated engine rotation speed when the inertia phase starts does not exceed the target engine rotation speed (S4: No), the transmission process unit 50 returns to S3, and performs the process of S3 again. On the other hand, in a case where the transmission process unit 50 determines that the estimated engine rotation speed when the inertia phase starts exceeds the target engine rotation speed (S4: Yes), the transmission process unit 50 turns on the transmission progress determination (S5).

Next, the transmission process unit 50 performs a learning process of the inertia phase start time (S6).

Figure 14:
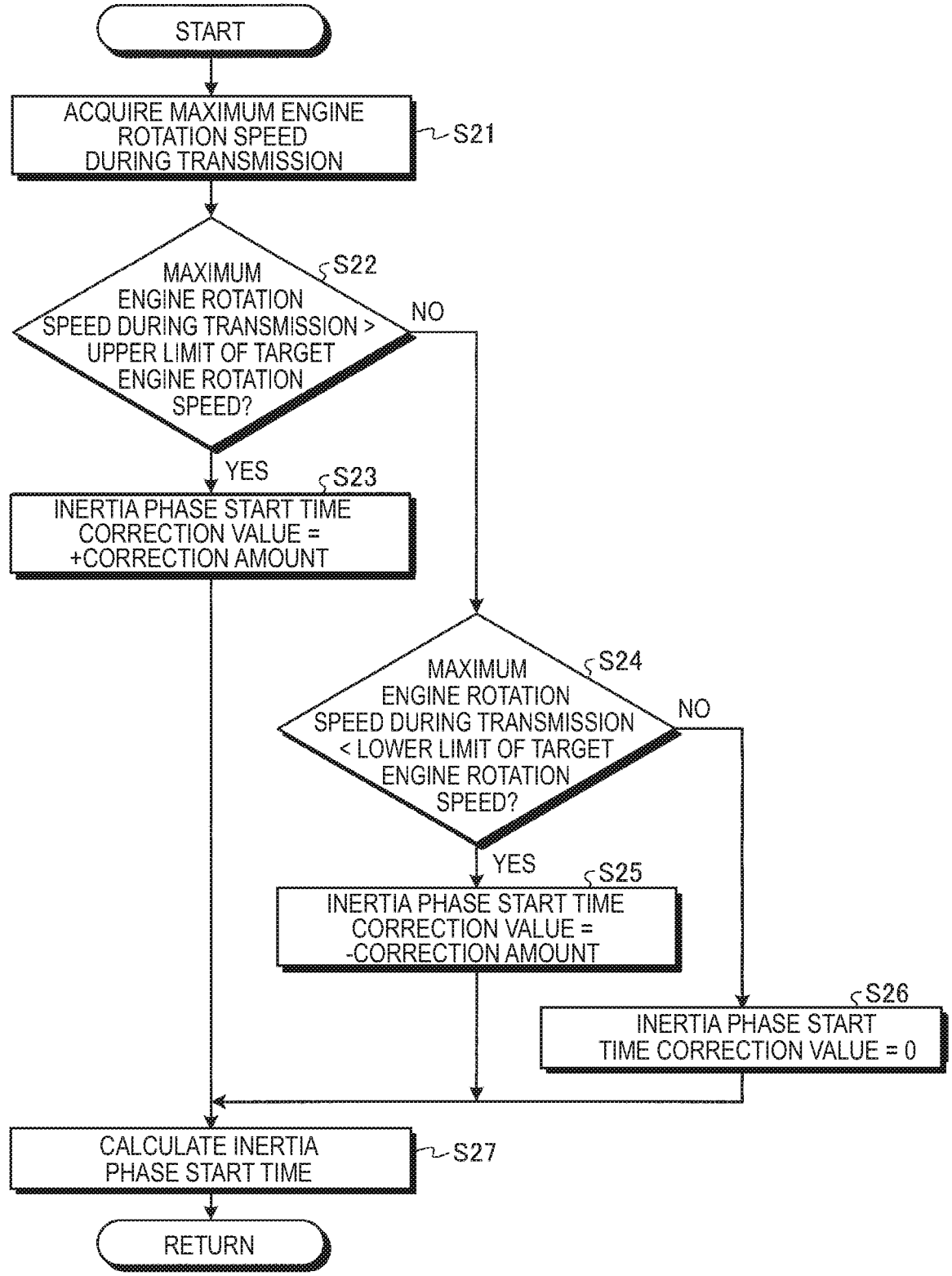
FIG. 14 is a flowchart illustrating a learning process of an inertia phase start time performed by the transmission process unit of the transmission control device according to the embodiment.

The learning of the inertia phase start time will be described with reference to FIG. 14. FIG. 14 is a flowchart illustrating the learning process of the inertia phase start time which is performed by the transmission process unit 50 of the transmission control device 7 according to the embodiment. As illustrated in FIG. 14, the transmission process unit 50 of the transmission control device 7 acquires a maximum engine rotation speed during the transmission, which is a maximum rotation speed of the engine 1 while the transmission control is performed (S21). Specifically, the transmission process unit 50 stores the engine rotation speed for each prescribed time while the transmission control is performed, in an engine rotation speed storage region disposed in the storage unit 60. Then, the maximum engine rotation speed out of the plurality of engine rotation speeds stored in the engine rotation speed storage region is acquired as the maximum engine rotation speed during the transmission. In the transmission process unit 50, the engine rotation speed in the previous transmission control which is already stored in the engine rotation storage region is deleted when the current transmission control starts. A method of acquiring the maximum engine rotation speed during the transmission in S21 is not limited to the above-described example. For example, the engine rotation speed is stored for each prescribed time while the transmission control is performed, and is updated in a case where the engine rotation speed is higher than the previous engine rotation speed. In this manner, the maximum engine rotation speed may be stored, and the engine rotation speed may be acquired as the maximum engine rotation speed during the transmission.

Next, the transmission process unit 50 determines whether or not the maximum engine rotation speed during the transmission exceeds an upper limit of the target engine rotation speed (S22). In a case where the transmission process unit 50 determines that the maximum engine rotation speed during the transmission exceeds the upper limit of the target engine rotation speed (S22: Yes), the transmission process unit 50 determines that the setting of the inertia phase start time is short, and sets an inertia phase start time correction value which is a correction value of the inertia phase start time, to "+correction amount" which is a positive correction amount.

On the other hand, in a case where the transmission process unit 50 determines that the maximum engine rotation speed during the transmission does not exceed the upper limit of the target engine rotation speed (S22: No), the transmission process unit 50 determines whether or not the maximum engine rotation speed during the transmission falls below a lower limit of the target engine rotation speed (S24). In a case where the transmission process unit 50 determines that the maximum engine rotation speed during the transmission falls below the lower limit of the target engine rotation speed (S24: Yes), the transmission process unit 50 determines that the setting of the inertia phase start time is long, and sets the inertia phase start time correction value to "−correction amount" which is a negative correction amount.

In a case where the maximum engine rotation speed during the transmission does not exceed the upper limit of the target engine rotation speed (S22: No) and the maximum engine rotation speed during the transmission falls below the lower limit of the target engine rotation speed (S24: No), that is, in a case where the maximum engine rotation speed during the transmission falls within a range between the upper limit and the lower limit of the target engine rotation speed, the transmission process unit 50 determines that the setting of the inertia phase start time is correct, and sets the inertia phase start time correction value to "0" (S26).

Next, the transmission process unit 50 calculates a new inertia phase start time by adding the inertia phase start time correction value to the inertia phase start time obtained before correction (S27). The transmission process unit 50 causes the storage unit 60 to store the calculated inertia phase start time. In this way, the transmission process unit 50 learns the inertia phase start time.

As described above, the transmission process unit 50 sets the time from the torque phase control start time (time t4) to the estimated inertia phase change start time (time t8) as the inertia phase start time, and uses the inertia phase start time in estimating the engine rotation speed when the inertia phase starts. This inertia phase start time is corrected by performing the learning for each transmission control so that the engine rotation speed (maximum engine rotation speed during the transmission) at the inertia phase start time falls within a range of the upper limit and the lower limit of the target engine rotation speed. The reason for performing the correction by learning the inertia phase start time in this way is as follows. There is a possibility that the transmission start timing may vary due to an individual difference of the transmission gear 2 or long-term deterioration.

Figure 15:
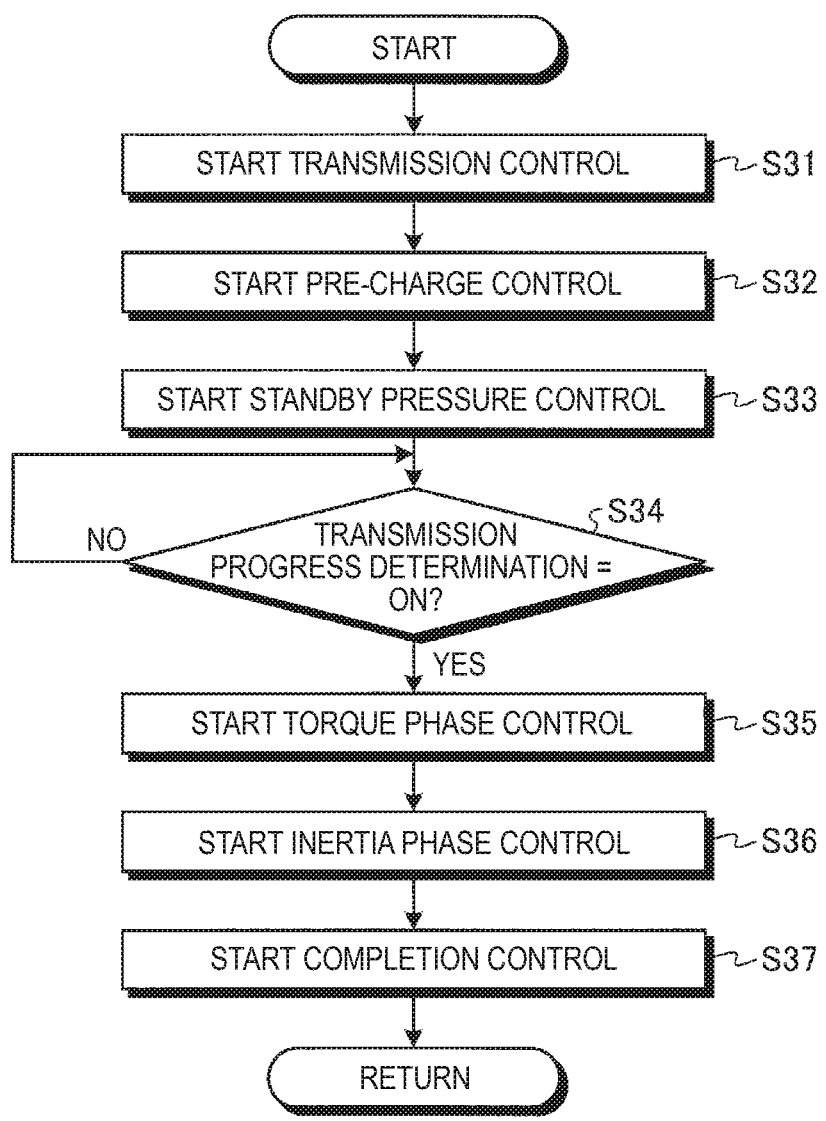
FIG. 15 is a flowchart illustrating a hydraulic control process of a coupling-side friction coupling portion, which is performed by the transmission process unit of the transmission control device according to the embodiment.

FIG. 15 is a flow chart illustrating the hydraulic control process of the coupling-side friction coupling portion which is performed by the transmission process unit 50 of the transmission control device 7 according to the embodiment.

As illustrated in FIG. 15, when the transmission process unit 50 starts the coupling-side transmission control (S31), the transmission process unit 50 starts the pre-charge control (S32).

When the pre-charge control is completed, the transmission process unit 50 starts the standby pressure control (S33). In a case where the transmission progress determination is not turned "ON", that is, in a case of "OFF" (S34: No), the transmission process unit 50 continues the standby pressure control. On the other hand, in a case where the transmission progress determination is turned "ON" (S34: Yes), the transmission process unit 50 starts the torque phase control (S35).

When the torque phase control is completed, the transmission process unit 50 starts the inertia phase control (S36). When the inertia phase control is completed, the transmission process unit 50 starts the completion control (S37).

As described above, in the hydraulic control process of the coupling-side friction coupling portion CB, the transmission process unit 50 maintains the hydraulic pressure of the coupling-side friction coupling portion CB by performing the standby pressure control, and performs the subsequent control when the transmission progress determination is turned "ON". In this manner, the transmission process unit 50 causes the inertia change to occur at the target engine rotation speed.

Figure 16:
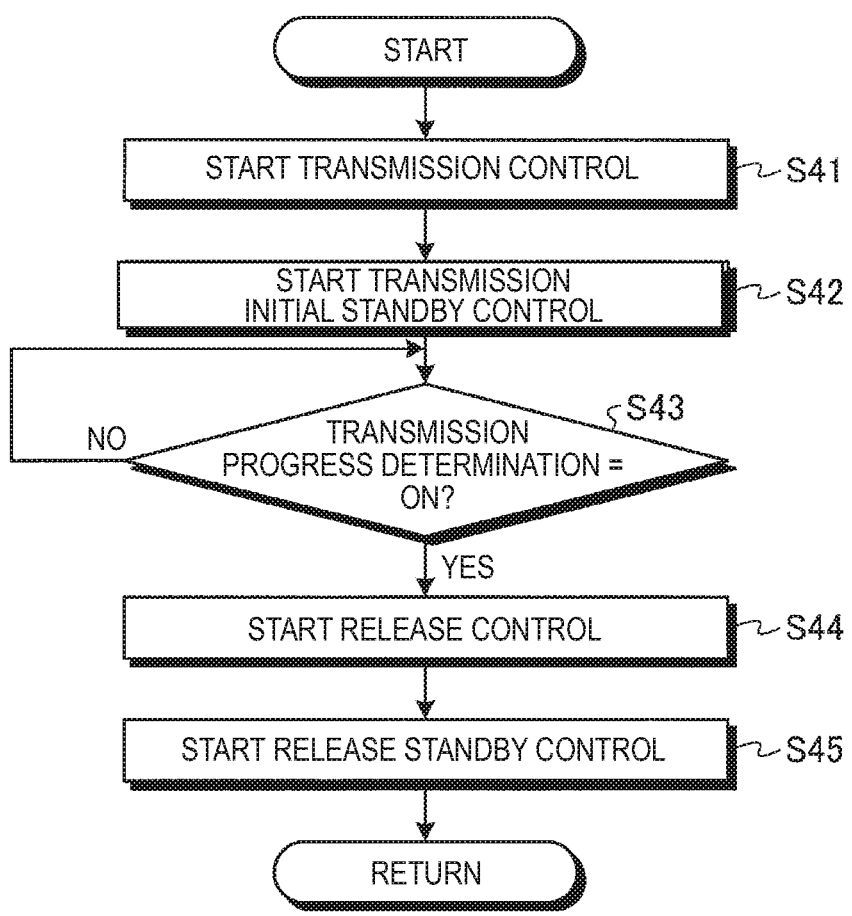
FIG. 16 is a flowchart illustrating a hydraulic control process of a release-side friction coupling portion, which is performed by the transmission process unit of the transmission control device according to the embodiment.

FIG. 16 is a flow chart illustrating the hydraulic control process of the release-side friction coupling portion which is performed by the transmission process unit 50 of the transmission control device 7 according to the embodiment.

As illustrated in FIG. 16, when the transmission process unit 50 starts the release-side transmission control (S41), the transmission process unit 50 starts the transmission initial standby control (S42). In a case where the transmission progress determination is not turned "ON", that is, in a case of "OFF" (S43: No), the transmission process unit 50 continues the transmission initial standby pressure control. On the other hand, in a case where the transmission progress determination is turned "ON" (S43: Yes), the transmission process unit 50 starts the release control (S44). After the release control is completed, the transmission process unit 50 starts the release standby control (S45).

As described above, in the hydraulic control process of the release-side friction coupling portion CB, the transmission process unit 50 maintains the hydraulic pressure of the release-side friction coupling portion CB by performing the transmission initial standby control, and performs the subsequent control when the transmission progress determination is turned "ON". In this manner, the transmission process unit 50 causes the inertia change to occur at the target engine rotation speed.

Next, a process according to the embodiment will be described in comparison with a process according to a comparative example with reference to FIGS. 17 and 18.

Figure 17:
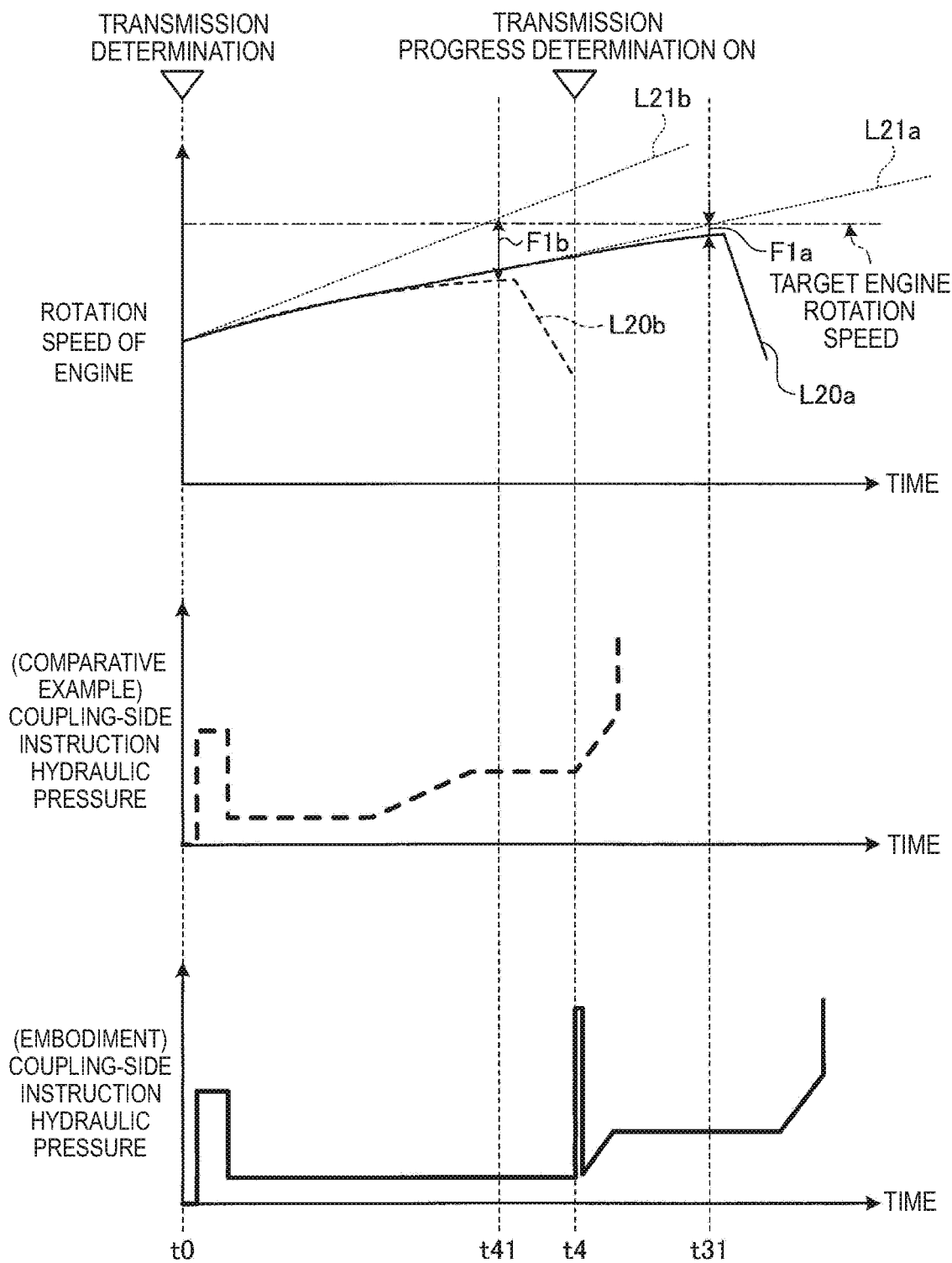
FIG. 17 is a timing chart illustrating a process in FIG. 11 and a process of a comparative example, which are performed by the transmission process unit of the transmission control device according to the embodiment, and illustrates a case where a change rate of the engine rotation speed decreases during transmission control.

FIG. 17 is a timing chart illustrating the process in FIG. 11 and the process of the comparative example which are performed by the transmission process unit 50 of the transmission control device 7 according to the embodiment, and is a view illustrating a case where a change rate of the rotation speed of the engine 1 decreases during the transmission control. FIG. 18 is a timing chart illustrating the process in FIG. 11 and the process of the comparative example which are performed by the transmission process unit 50 of the transmission control device 7 according to the embodiment, and is a view illustrating a case where the change rate of the rotation speed of the engine 1 increases during the transmission control. Lines L20a and L20b illustrated in FIGS. 17 and 18 are respectively the engine rotation speeds according to the embodiment and the comparative example. A line L21a indicates an expected rotation speed of the engine 1 (hereinafter, also referred to as an expected engine rotation speed) calculated based on the change rate of the rotation speed of the engine 1 when the transmission progress determination in the embodiment is turned ON (time t4). A line L21b indicates an expected engine rotation speed calculated based on the change rate of the engine rotation speed when the transmission is determined in the comparative example.

The process of the comparative example is different from the process in FIG. 11 according to the embodiment in that the pin charge control is not performed and calculation methods of the inertia phase start time are different from each other. In the process of the comparative example, a time from a transmission control start time (time t0) to an inertia phase change start estimated time (time t41) is defined as an inertia phase start time. In contrast, in the example in FIG. 11 according to the embodiment, as described above, a time from a torque phase control start time (time t4) to an inertia phase change start estimated time (time t31) is defined as the inertia phase start time.

FIG. 17 illustrates an example in a case where the change rate (acceleration) of the rotation speed of the engine 1 decreases after the transmission determination (time t0) is performed. In this case, in the comparative example, the preparation control (pre-charge control and standby control) for switching between the friction coupling portions CB is performed after the transmission determination is performed. Accordingly, a time is required until the friction coupling portions are actually switched after the transmission determination is performed. Therefore, in the comparative example, a deviation is relatively large between the actual rotation speed of the engine 1 and the expected engine rotation speed (Fib illustrated in FIG. 17). Accordingly, in some cases, the engine rotation speed when the inertia phase starts may greatly deviate from the target engine rotation speed.

In contrast, according to the present embodiment, the transmission progress determination is performed during the standby control after the pre-charge control is completed. Accordingly, the deviation is relatively small between the actual rotation speed of the engine 1 and the expected engine rotation speed (Fla illustrated in FIG. 17). Therefore, it is possible to prevent the engine rotation speed when the inertia phase starts from greatly deviating from the target engine rotation speed.

Figure 18:
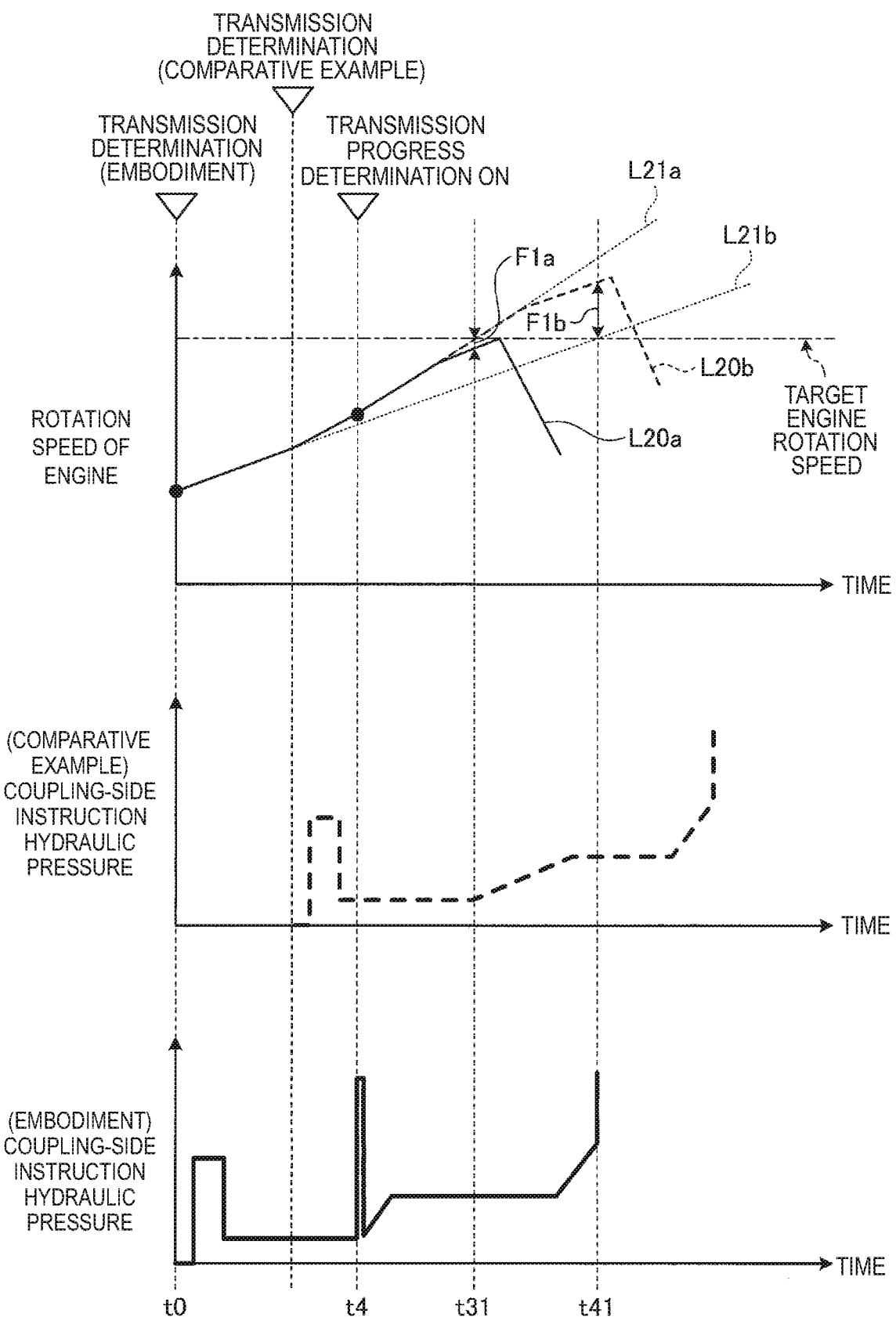
FIG. 18 is a timing chart of a process in FIG. 11 and a process of a comparative example, which are performed by the transmission process unit of the transmission control device according to the embodiment, and illustrates a case where the change rate of the engine rotation speed decreases during the transmission control.

FIG. 18 illustrates an example in a case where the change rate (acceleration) of the rotation speed of the engine 1 increases after the transmission determination (time t0) is performed. In this case, according to the embodiment, starting the transmission control is determined by the transmission line H, and the pre-charge control of the transmission preparation control is completed before the transmission progress determination. Accordingly, even in a case where the change rate of the rotation speed of the engine 1 increases during the transmission control, the control subsequent to the torque phase control can be quickly performed. Therefore, the engine rotation speed when the inertia phase starts is easily adjusted to the target engine rotation speed.

As will be understood from the above description, in the example in FIG. 11, the following processes are performed. That is, the timing of the inertia start is adjusted after the transmission control starts. After the transmission control starts in accordance with the transmission determination, in a state where the transmission preparation control (pre-charge control and standby pressure control) is completed, that is, in a state where the coupling-side friction coupling portion CB completes the movement (stroke) of the piston 33, a control state is held in a state where the hydraulic pressure of the release-side friction coupling portion CB is decreased to the hydraulic pressure at which the friction coupling portion CB can hold the torque capacity. Then, in a stage where the estimated engine pressure rotation speed when the inertia phase starts (maximum engine rotation speed during the transmission) reaches the target engine rotation speed, the control subsequent to the torque phase is performed.

After the transmission control starts, the maximum engine rotation speed is stored. After the transmission control starts in accordance with the transmission determination, the estimated engine rotation speed when the inertia phase starts is calculated.

The inertia phase start time is learned in each transmission stage. In a case where the maximum engine rotation speed during the transmission exceeds the target range, the inertia phase start time is extended. In a case where the maximum engine rotation speed during the transmission falls below the target range, the inertia phase start time is shortened. In the above-described example, the estimated engine rotation speed when the inertia phase starts is calculated using Equation (1) below, but is not limited thereto. For example, the estimated engine rotation speed when the inertia phase starts may be calculated using Equation (2) or Equation (3) below.

Estimated engine rotation speed when the inertia phase starts=(Engine rotation speed)+(Inertia phase start time)×(Engine rotation speed change rate) (2)

Estimated engine rotation speed when the inertia phase starts=(Rotation speed of the output shaft 2b)×(Current transmission ratio)+(Inertia phase start time)×(Change rate of the rotation speed of the output shaft 2b)×(Current transmission ratio)+Estimated slip amount (3)

As described above, for example, the transmission control device 7 of the transmission gear 2 according to the embodiment includes the determination unit 52 that determines the change in the transmission stages, and the output unit 53 that sets the target value of the hydraulic pressure and outputs the target value to the hydraulic control device 8. In a case where the determination unit 52 determines that one transmission stage is to be changed to another transmission stage, the output unit 53 increases the target value for the coupling-side friction coupling portion CB (first friction coupling portion) which is the friction coupling portion CB in the uncoupled state in the one transmission stage to the coupling-side instruction hydraulic pressure Pr1 (first value). Thereafter, the output unit 53 decreases the target value to the coupling-side instruction hydraulic pressure Pr2 (second value) which is lower than the coupling-side instruction hydraulic pressure PR1 and at which the uncoupled state of the coupling-side friction coupling portion CB is maintained. After decreasing the target value to the coupling-side instruction hydraulic pressure Pr2, the output unit 53 temporarily increases the target value to the coupling-side instruction hydraulic pressure Pr3 (third value) which is higher than the coupling-side instruction hydraulic pressure Pr2.

Therefore, according to the transmission control device 7, for example, while the target value is set to the coupling-side instruction hydraulic pressure Pr2 (during the standby pressure control), the uncoupled state of the coupling-side friction coupling portion CB is maintained. In this manner, no frictional force is generated in the coupling-side friction coupling portion CB during the period. Therefore, it is possible to prevent durability of the friction coupling portion CB from being degraded. After the target value is decreased to the coupling-side instruction hydraulic pressure Pr2, the target value is temporarily increased to the coupling-side instruction hydraulic pressure Pr3 which is higher than the coupling-side instruction hydraulic pressure Pr2. Accordingly, it is possible to improve flowing ability of the actual hydraulic pressure which follows the target value of the hydraulic pressure after the target value is temporarily increased to the coupling-side instruction hydraulic pressure Pr3.

In the transmission control device 7, for example, the output unit 53 determines whether to change the target value to the coupling-side instruction hydraulic pressure Pr3, while the target value is set to the coupling-side instruction hydraulic pressure Pr2.

Therefore, according to the transmission control device 7, for example, when the inertia phase starts, the rotation speed of the engine 1 connected to the transmission gear 2 is easily adjusted (closer) to the target rotation speed of the engine 1.

For example, the transmission control device 7 includes the acquisition unit 51 that acquires the acceleration opening degree indicating the operation amount of the accelerator member of the engine 1 which outputs the power to the transmission gear 2. In a case where the acceleration opening degree acquired by the acquisition unit 51 is equal to or greater than the threshold, the output unit 53 determines whether to change the target value to the coupling-side instruction hydraulic pressure Pr3, while the target value is set to the coupling-side instruction hydraulic pressure Pr2. In a case where the acceleration opening degree acquired by the acquisition unit 51 is smaller than the threshold, the output unit 53 does not determines whether to change the target value to the coupling-side instruction hydraulic pressure Pr3, while the target value is set to the coupling-side instruction hydraulic pressure Pr2.

Therefore, according to the transmission control device 7, for example, in a case where the acceleration opening degree is equal to or greater than the threshold, when the inertia phase starts, the rotation speed of the engine 1 is easily adjusted to (closer to) the target engine rotation speed. The process of the output unit 53 in a case where the acceleration opening degree acquired by the acquisition unit 51 is smaller than the threshold is not limited to the above-described example. For example, in a case where the acceleration opening degree acquired by the acquisition unit 51 is smaller than the threshold, the output unit 53 may not determine whether to change the target value to the coupling-side instruction hydraulic pressure Pr3 for a predetermined time after the target value is set to the coupling-side instruction hydraulic pressure Pr2. The output unit 53 may determine as described above after the predetermined time elapses.

In the transmission control device 7, for example, after the output unit 53 increases the target value of the hydraulic pressure to the coupling-side instruction hydraulic pressure Pr3, the output unit 53 sets the target value to the coupling-side instruction hydraulic pressure Pr4 (fourth value) which is lower than the coupling-side instruction hydraulic pressure Pr3. After setting the target value to the coupling-side instruction hydraulic pressure Pr4, the output unit 53 sets the target value to the coupling-side instruction hydraulic pressure Pr5 (fifth value) which is equal to or higher than the coupling-side instruction hydraulic pressure Pr4 and which generates the frictional force of the friction coupling portion CB. The output unit 53 sets the coupling-side instruction hydraulic pressure Pr4 in accordance with the magnitude of the input torque to the transmission gear 2.

Therefore, according to the transmission control device 7, for example, even if the setting of the coupling-side instruction hydraulic pressure Pr5 is changed in accordance with the input torque from the engine 1 to the transmission gear 2, the coupling-side instruction hydraulic pressure Pr2 can be maintained constant. Therefore, a transmission shock cause is likely to be identified. The time required for the torque phase control is likely to be constant. That is, a difference is less likely to occur between the estimated value of the rotation speed of the engine 1 when the inertia phase starts and the actual rotation speed of the engine 1, which are estimated using the torque phase control time.

In the above-described embodiment, the process in FIG. 7 is performed in a case where the actual acceleration opening degree is smaller than the prescribed threshold, and the process in FIG. 11 is performed in a case where the actual acceleration opening degree is equal to or greater than the prescribed threshold. However, the embodiments disclosed here are not limited thereto. For example, the process in FIG. 7 may be performed regardless of the actual acceleration opening degree. In addition, the process in FIG. 11 may be performed regardless of the actual acceleration opening degree.

In the above-described embodiment, the output unit 53 sets the coupling-side instruction hydraulic pressure Pr4 (fourth value) in accordance with only the magnitude of the input torque to the transmission gear 2. However, the embodiments disclosed here are not limited thereto. For example, the output unit 53 may set the coupling-side instruction hydraulic pressure Pr4 in accordance with the magnitude of the input torque to the transmission gear 2 and the coupling-side instruction hydraulic pressure Pr2 (second value). Specifically, the target value is set for each coupling-side instruction hydraulic pressure Pr5 (fifth value) (for example, for each of the lines $1\_1a$ to $L1f$ illustrated in FIG. 9). The coupling-side instruction hydraulic pressure Pr4 (fourth value) is set to be higher, as the coupling-side instruction hydraulic pressure Pr2 (second value) during the actual transmission control is smaller than a design theoretical value or the threshold serving as the coupling-side instruction hydraulic pressure Pr2 (second value) determined by the previous transmission. The coupling-side instruction hydraulic pressure Pr4 (fourth value) is set to be lower, as the coupling-side instruction hydraulic pressure Pr2 (second value) during the actual transmission control is greater than the design theoretical value or the threshold. In this manner, even in a case where the coupling-side instruction hydraulic pressure Pr2 (second value) is not stabilized due to variations in the control, the actual hydraulic pressure more quickly follows the coupling-side instruction hydraulic pressure Pr5 (fifth value) which is the target value. That is, in a case where the coupling-side instruction hydraulic pressure Pr2 (second value) is smaller than the predetermined value, it is better not to excessively decrease the coupling-side instruction hydraulic pressure Pr4 (fourth value). In this case, the actual hydraulic pressure is likely to reach the coupling-side instruction hydraulic pressure Pr5 (fifth value).

A transmission control device according to an aspect is a transmission control device of an automatic transmission device which includes a transmission gear that has a plurality of friction coupling portions that are changed in accordance with a hydraulic pressure between a coupled state where a first coupling target and a second coupling target are coupled to each other by using a frictional force and an uncoupled state where the first coupling target and the second coupling target are uncoupled from each other, and that configure a plurality of transmission stages corresponding to a combination of the coupled state and the uncoupled state of the plurality of friction coupling portions, and a hydraulic control device that controls the hydraulic pressure. The transmission control device includes a determination unit that determines a change in the transmission stage, and an output unit that sets a target value of the hydraulic pressure, and outputs the target value to the hydraulic control device. In a case where the determination unit determines that one transmission stage is to be changed to another transmission stage, the output unit increases the target value to a first value for a first friction coupling portion which is the friction coupling portion in the uncoupled state in the one transmission stage, thereafter, the output unit decreases the target value to a second value which is smaller than the first value and which maintains the uncoupled state of the first friction coupling portion, and after the target value is decreased to the second value, the output unit temporarily increases the target value to a third value which is greater than the second value.

Therefore, according to the transmission control device, for example, during a period in which the target value is set to the second value, the uncoupled state of the first friction coupling portion is maintained. In this manner, no frictional force is generated in the first friction coupling portion during the period. Therefore, it is possible to prevent durability of the friction coupling portion from being degraded. After the target value decreases to the second value, the target value is temporarily increased to the third value which is greater than the second value. Accordingly, it is possible to improve flowing ability of the actual hydraulic pressure which follows the target value of the hydraulic pressure after the target value is temporarily increased to the third value.

In the transmission control device, for example, the output unit may determine whether to change the target value to the third value while the target value is set to the second value.

Therefore, according to the transmission control device, for example, when an inertia phase starts, a rotation speed of an engine connected to the transmission gear is easily adjusted to (closer to) a target rotation speed of the engine.

For example, the transmission control device may further include an acquisition unit that acquires an acceleration opening degree indicating an operation amount of an accelerator member of an engine that outputs power to the transmission gear. In a case where the acceleration opening degree acquired by the acquisition unit is equal to or greater than a threshold, the output unit may determine whether to change the target value to the third value while the target value is set to the second value.

Therefore, according to the transmission control device, for example, in a case where the acceleration opening degree is equal to or greater than the threshold, when the inertia phase starts, the rotation speed of the engine connected to the transmission gear is easily adjusted to (closer to) the target rotation speed of the engine.

In the transmission control device, the output unit may estimate an estimated engine rotation speed when an inertia phase starts, and in a case where the estimated engine rotation speed exceeds a target engine rotation speed, the output unit may determine whether to change the target value to the third value while the target value is set to the second value.

For example, in the transmission control device, after increasing the target value to the third value, the output unit may set the target value to a fourth value which is smaller than the third value, and after setting the target value to the fourth value, the output unit may set the target value to a fifth value which is equal to or greater than the fourth value and which generates the frictional force. The output unit may set the fourth value in accordance with a magnitude of a torque input to the transmission gear.

Therefore, according to the transmission control device, for example, even if the set fifth value is changed in accordance with the torque input to the transmission gear from the engine, the second value can be maintained constant. Therefore, a transmission shock cause is likely to be identified.

Although several embodiments disclosed here have been described, the embodiments are presented as examples, and are not intended to limit the scope of the embodiments disclosed here. The novel embodiments can be implemented in various other forms, and various omissions, substitutions, and modifications can be made within the scope not departing from the gist of the embodiments disclosed here. The embodiments and modifications thereof are included in the scope and the gist of the embodiments disclosed here, and are included in the embodiments described in the appended claims and the equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A transmission control device of an automatic transmission device which includes a transmission gear that has a plurality of friction coupling portions that are changed in accordance with a hydraulic pressure between a coupled state where a first coupling target and a second coupling target are coupled to each other by using a frictional force and an uncoupled state where the first coupling target and the second coupling target are uncoupled from each other, and that configure a plurality of transmission stages corresponding to a combination of the coupled state and the uncoupled state of the plurality of friction coupling portions, and a hydraulic control device that controls the hydraulic pressure, the device comprising:
   a determination unit that determines a change in the transmission stage;
   an acquisition unit that acquires an acceleration opening degree indicating an operation amount of an accelerator member of an engine that outputs power to the transmission gear; and
   an output unit that sets a target value of the hydraulic pressure, and outputs the target value to the hydraulic control device, wherein
   in a case where the determination unit determines that one transmission stage is to be changed to another transmission stage, the output unit increases the target value to a first value for a first friction coupling portion which is the friction coupling portion in the uncoupled state in the one transmission stage, thereafter, the output unit decreases the target value to a second value which is smaller than the first value and which maintains the uncoupled state of the first friction coupling portion, and after the target value is decreased to the second value, the output unit temporarily increases the target value to a third value which is greater than the second value,
   the output unit determines whether to change the target value to the third value while the target value is set to the second value, and
   in a case where the acceleration opening degree acquired by the acquisition unit is equal to or greater than a threshold, the output unit determines whether to change the target value to the third value while the target value is set to the second value.

2. The transmission control device of an automatic transmission device according to claim 1, wherein
   the output unit estimates an estimated engine rotation speed at a time when an inertia phase starts, and in a case where the estimated engine rotation speed exceeds a target engine rotation speed, the output unit determines whether to change the target value to the third value while the target value is set to the second value.

3. The transmission control device of an automatic transmission device according to claim 1, wherein
   after increasing the target value to the third value, the output unit sets the target value to a fourth value which is smaller than the third value, and after setting the target value to the fourth value, the output unit sets the target value to a fifth value which is equal to or greater than the fourth value and which generates the frictional force, and
   the output unit sets the fourth value in accordance with a magnitude of a torque input to the transmission gear.

4. The transmission control device of an automatic transmission device according to claim 2, wherein the output unit estimates the engine rotation speed at the time when the inertia phase starts based on a turbine rotation speed change rate.

5. A transmission control device of an automatic transmission device which includes a transmission gear that has a plurality of friction coupling portions that are changed in accordance with a hydraulic pressure between a coupled state where a first coupling target and a second coupling target are coupled to each other by using a frictional force and an uncoupled state where the first coupling target and the second coupling target are uncoupled from each other, and that configure a plurality of transmission stages corresponding to a combination of the coupled state and the uncoupled state of the plurality of friction coupling portions, and a hydraulic control device that controls the hydraulic pressure, the device comprising:
   a determination unit that determines a change in the transmission stage; and
   an output unit that sets a target value of the hydraulic pressure, and outputs the target value to the hydraulic control device, wherein
   in a case where the determination unit determines that one transmission stage is to be changed to another transmission stage, the output unit increases the target value to a first value for a first friction coupling portion which is the friction coupling portion in the uncoupled state in the one transmission stage, thereafter, the output unit decreases the target value to a second value which is smaller than the first value and which maintains the uncoupled state of the first friction coupling portion, and after the target value is decreased to the second value, the output unit temporarily increases the target value to a third value which is greater than the second value,
   the output unit determines whether to change the target value to the third value while the target value is set to the second value, and
   the output unit estimates an estimated engine rotation speed at a time when an inertia phase starts based on a turbine rotation speed change rate, and in a case where the estimated engine rotation speed exceeds a target engine rotation speed, the output unit determines whether to change the target value to the third value while the target value is set to the second value.

* * * * *